United States Patent
Nawa et al.

[11] Patent Number: 5,854,158
[45] Date of Patent: Dec. 29, 1998

[54] ZRO₂ BASED CERAMIC MATERIAL AND METHOD OF PRODUCING THE SAME

[75] Inventors: Masahiro Nawa, Katano; Shoichi Nakamoto, Neyagawa; Koichi Niihara, Suita; Tohru Sekino, Toyonaka, all of Japan

[73] Assignee: Matsushita Electric Works, Ltd., Osaka, Japan

[21] Appl. No.: 873,244

[22] Filed: Jun. 11, 1997

[30] Foreign Application Priority Data

Nov. 10, 1996 [JP] Japan .................................. 8-281464

[51] Int. Cl.⁶ ...................... C04B 35/482; C04B 35/488; C04B 35/49

[52] U.S. Cl. ........................ 501/104; 264/604; 264/642; 264/648; 264/688; 264/661; 264/663; 264/681

[58] Field of Search .................................. 501/104, 105; 264/604, 642, 648, 658, 661, 663, 681

[56] References Cited

U.S. PATENT DOCUMENTS

| | | | |
|---|---|---|---|
| Re. 32,449 | 6/1987 | Claussen et al. | 501/103 |
| 4,820,666 | 4/1989 | Hirano et al. | 501/104 |
| 4,820,667 | 4/1989 | Tsunekawa et al. | 501/104 |
| 4,977,114 | 12/1990 | Horinouchi et al. | 501/104 |
| 5,002,911 | 3/1991 | Matsumoto et al. | 501/105 |
| 5,419,827 | 5/1995 | Nantaki et al. | 204/421 |

FOREIGN PATENT DOCUMENTS

| | | | |
|---|---|---|---|
| 0 257 963 | 3/1988 | European Pat. Off. | C04B 35/48 |
| 43 13 305 | 10/1994 | Germany | C04B 35/48 |
| 64-7029 | 2/1989 | Japan . | |
| 5-246760 | 9/1993 | Japan . | |
| 8-268755 | 10/1996 | Japan . | |
| 2 305 430 | 4/1997 | United Kingdom | C04B 35/49 |

OTHER PUBLICATIONS

Jing–Fong Tsai et al.; "Transformation Plasticity and Toughening in CeO₂–Partially–Stabilized Zirconia–Alumina (Ce–TZP/Al₂O₃) Composites Doped with MnO", (1992), pp. 1229–1238.

*Primary Examiner*—David Brunsman
*Attorney, Agent, or Firm*—Burns, Doane, Swecker & Mathis, L.L.P.

[57] ABSTRACT

A $ZrO_2$ based ceramic material having excellent mechanical strength and fracture toughness comprises a first phase of $ZrO_2$ grains containing $CeO_2$ as a stabilizer and having an average grain size of 5 μm or less, a second phase of $Al_2O_3$ grains having an average grain size of 2 μm or less, and a third phase of elongated crystals of a complex oxide of Al, Ce, and one of Mg and Ca. At least 90 vol % of the first phase is composed of tetragonal $ZrO_2$. An aluminum (Al) content in the ceramic material is determined such that when Al of the complex oxide is converted to $Al_2O_3$, a total amount of $Al_2O_3$ in the ceramic material is within a range of 0.5 to 50 vol %. A content of the third phase in the ceramic material is determined within a range of 0.5 to 5 by area %. It is preferred that fine $Al_2O_3$ grains having an average grain size of 1 μm or less of the second phase are dispersed within the $ZrO_2$ grains at a dispersion ratio of at least 2%.

21 Claims, 5 Drawing Sheets ic strength and toughness, and a method of producing the same.

ZRO₂ BASED CERAMIC MATERIAL AND METHOD OF PRODUCING THE SAME

BACKGROUND OF THE INVENTION

1. Field of the Invention

The present invention relates to a $ZrO_2$ based ceramic material having excellent mechanical strength and toughness, and a method of producing the same.

2. Disclosure of the Prior Art

Owing to superior heat-resisting property, wear-resistance, and corrosion-resistance of ceramics such as alumina ($Al_2O_3$), zirconia ($ZrO_2$), silicon nitride ($Si_3N_4$), or the like, it is expected to use the ceramics for wide applications as a turbocharger rotor for an automobile engine, various kinds of edged tools, mechanical parts such as a bearing, a mechanical seal and the like, a cutting bite, a drilling tool, crushing media, an optical connector ferrule, a dice, a saw and so on. However, mechanical strength and toughness of the ceramics are not always sufficient for those applications. That is, since the ceramics usually show very poor plastic deformation unlike a metal material, macro cracks tends to rapidly and readily proceed from fine defects or flaws in the ceramics. Therefore, it is desired to develop a ceramic material having improved mechanical strength and toughness, which can be used safely for a longer time period in those applications. As an example, ceramic materials comprising a $CeO_2$-partially stabilized $ZrO_2$ and $Al_2O_3$ are being studied.

Japanese Patent Publication [KOKOKU] No. 64-7029 discloses a ceramic material comprising 61 to 87 wt % of $ZrO_2$, 11 to 27 wt % of $CeO_2$ (cerium dioxide), and 20 wt % or less of $Al_2O_3$. $CeO_2$ forms a solid solution with $ZrO_2$, so that $ZrO_2$ crystals of the ceramic material are composed of 20% or less of monoclinic $ZrO_2$ and/or cubic $ZrO_2$ and the balance of tetragonal $ZrO_2$. This prior art discloses that when the content of $Al_2O_3$ is more than 20 wt %, a sintering temperature of the ceramic material increases, so that a grain growth of the zirconia crystals is caused. This will bring degradation in the mechanical strength of the ceramic material due to an enlargement of a flaw size.

Japanese Patent Early Publication [KOKAI] No. 5-246760 discloses a $ZrO_2$ based ceramic material comprising a matrix of a partially stabilized $ZrO_2$ containing 5 to 30 mol % of $CeO_2$ and a secondary phase of at least one selected from $Al_2O_3$, SiC, $Si_3N_4$, $B_4C$, carbides, nitrides and borides of elements of groups IVa, Va, VIa of the periodic table. Fine grains of the secondary phase are dispersed within grains as well as grain boundaries of the $ZrO_2$ matrix. When the content of $CeO_2$ is more than 30 mol %, the mechanical strength of the ceramic material lowers due to an increase of cubic $ZrO_2$. When the content of $CeO_2$ is less than 5 mol %, a formation of metastable tetragonal $ZrO_2$ is not sufficient. The ceramic material contains 0.5 to 50 vol % and more preferably 2.5 to 30 vol % of the secondary phase.

Japanese Patent Early Publication [KOKAI] No. 8-268755 discloses a $ZrO_2$ based ceramic material consisting essentially of 0.5 to 50 vol % of $Al_2O_3$ having an average grain size of 2 $\mu$m or less and the balance of a partially stabilized $ZrO_2$ having an average grain size of 5 $\mu$m or less. The partially stabilized $ZrO_2$ consists essentially of 8 to 12 mol % of $CeO_2$, 0.05 to 4 mol % of $TiO_2$ and the balance of $ZrO_2$. Fine $Al_2O_3$ grains having an average grain size of 1 $\mu$m or less are dispersed within the $ZrO_2$ grains at a dispersion ratio of at least 2%. The dispersion ratio is defined as a ratio of the number of $Al_2O_3$ grains dispersed within the $ZrO_2$ grains relative to the number of the entire $Al_2O_3$ grains dispersed in the ceramic material.

In addition, a ceramic material comprising 10 wt % of $Al_2O_3$, 1.5 wt % of MnO and the balance of $CeO_2$-partially stabilized $ZrO_2$ is disclosed in Journal of American Ceramic Society, 75 [5] 1229–38 (1992). The partially stabilized $ZrO_2$ contains 12 mol % of $CeO_2$. This prior art also discloses that MnO reacts with both $CeO_2$ and $Al_2O_3$ during a sintering step to form a new phase having an approximate composition of $CeMnAl_{11}O_{19}$. The ceramic material exhibits a mechanical strength of 650 MPa in four-point bending and a fracture toughness of 7.6 to 10. 3 $MPa.m^{1/2}$ in compact tension tests.

Thus, various attempts have been made to improve the mechanical properties of the $ZrO_2$—$Al_2O_3$ ceramic materials. However, there is room for further improvement of the mechanical properties.

SUMMARY OF THE INVENTION

A primary object of the present invention is to provide a $ZrO_2$ based ceramic material having improved mechanical strength and toughness. That is, the ceramic material comprises a first phase of $ZrO_2$ grains containing $CeO_2$ as a stabilizer and having an average grain size of 5 $\mu$m or less, a second phase of $Al_2O_3$ grains having an average grain size of 2 $\mu$m or less, and a third phase of elongated crystals of a complex oxide of Al, Ce, and one of Mg (magnesium) and Ca (calcium). At least 90 vol % of the first phase is composed of tetragonal $ZrO_2$. An Al content in the ceramic material is determined such that when Al of the complex oxide is converted to $Al_2O_3$, a total amount of $Al_2O_3$ in the ceramic material is within a range of 0.5 to 50 vol %. A content of the third phase in the ceramic material is determined within a range of 0.5 to 5 by area %.

It is preferred that fine $Al_2O_3$ grains having an average grain size of 1 $\mu$m or less of the second phase are dispersed within the $ZrO_2$ grains at a dispersion ratio of at least 2%. The dispersion ratio is defined as a ratio of the number of the $Al_2O_3$ grains dispersed within the grains of the $ZrO_2$ grains relative to the entire $Al_2O_3$ grains dispersed in the ceramic material.

It is also preferred that the elongated crystals has an average length of 2 to 50 $\mu$m with a maximum length up to 70 $\mu$m. In particular, it is preferred that an average aspect ratio of the elongated crystals is within a range of 2 to 25. The aspect ratio is defined as a ratio of length to width of each of the elongated crystals.

A further object of the present invention is to provide a method of producing the $ZrO_2$ based ceramic material of the present invention. That is, a first constituent corresponding to a composition of 8 to 12 mol % of $CeO_2$, 0.01 to 0.1 mol % of one of MgO (magnesium oxide) and CaO (calcium oxide), and the balance of $ZrO_2$ is mixed with a second constituent for forming $Al_2O_3$, to obtain a mixed powder. The mixed power is molded to a green compact having a desired shape. The green compact is sintered in an oxidative atmosphere at a temperature between 1400° C. and 1600° C. under an atmospheric pressure. A reaction of Ce and one of Mg and Ca supplied from the first constituent with Al supplied from the second constituent in the oxidative atmosphere during the sintering form the third phase of the ceramic material.

These and still other objects and advantages features of the present invention will become more apparent from the following description and examples of the present invention when taken in conjunction with the attached drawings.

DETAIL DESCRIPTION OF THE INVENTION

Figure 1:
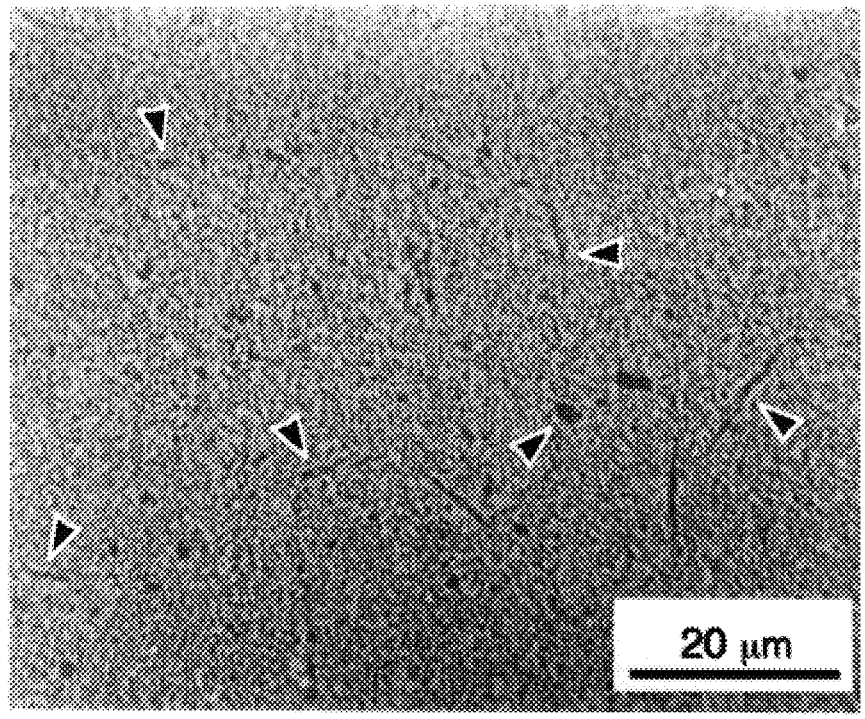
FIG. 1 is a scanning electron micrograph of a $ZrO_2$ based ceramic material of Example 5 of the present invention.

A $ZrO_2$ based ceramic material of the present invention comprises a first phase of $ZrO_2$ grains containing $CeO_2$ as a stabilizer and having an average grain size of 5 $\mu$m or less, a second phase of $Al_2O_3$ grains having an average grain size of 2 $\mu$m or less, and a third phase of elongated crystals of a complex oxide of Al, Ce, and one of Mg and Ca.

As to the first phase, $CeO_2$ forms a solid solution with $ZrO_2$ and behaves as the stabilizer for metastably keeping tetragonal $ZrO_2$, which is a crystal phase stable at a high temperature, down to a room temperature. In the present invention, the first phase contains $CeO_2$ in such an amount that at least 90 vol % of the first phase is composed of tetragonal $ZrO_2$. When the volume content of tetragonal $ZrO_2$ is less than 90 vol %, there is a tendency that mechanical properties of the ceramic material deteriorate because of an excess amount of monoclinic and/or cubic $ZrO_2$ in the first phase. In particular, when an excess amount of monoclinic $ZrO_2$ appears in the first phase, micro cracks often develop in the ceramic material.

As to the second phase, an Al content in the ceramic material is determined such that when Al of the complex oxide is converted to $Al_2O_3$, a total amount of $Al_2O_3$ in the ceramic material is within a range of 0.5 to 50 vol %, and more preferably 2.5 to 30 vol %. When the amount of $Al_2O_3$ is less than 0.5 vol %, a contribution of the second phase to the mechanical properties of the ceramic material is not obtained. In addition, a sufficient amount of the third phase is not formed in the ceramic material. As the amount of $Al_2O_3$ increases more than 50 vol %, the mechanical toughness of the ceramic material gradually lowers.

As to the third phase, a content of the third phase in the ceramic material is determined within a range of 0.5 to 5 by area %. The content (area %) of the third phase is represented by the following equation;

Content of Third Phase (area %)=$(t/T)\times 100$ where "T" is a total area of an observation region of the ceramic material observed by the use of a scanning electron microscope (SEM) and/or transmission electron microscope (TEM), and "t" is an area of the third phase exposed on the observation region of ceramic material. When the content of the third phase is less than 0.5 area %, a contribution of the third phase to an improvement of mechanical toughness of the ceramic material is not sufficiently obtained. When the content of the third phase is more than 5 area %, there is a problem that variations in the mechanical strength increase, and an average mechanical strength of the ceramic material decreases.

It is believed that mechanical properties of the present ceramic material are improved according to the following mechanism. That is, residual stress fields are generated around the $ZrO_2$ grains, $Al_2O_3$ grains, and the elongated crystals of the complex oxide during a cooling step from a sintering temperature of the ceramic material. At the residual stress fields, a large number of dislocations occur within the $ZrO_2$ grains. The dislocations are piled up each other to form sub-grain boundaries within the $ZrO_2$ grains. The formation of the sub-grain boundaries provides a fine grain structure, and is useful to increase a critical stress necessary for causing a stress induced phase transformation from tetragonal $ZrO_2$ to monoclinic $ZrO_2$. In addition, since cracks developed in the ceramic material are bowed or deflected by the $Al_2O_3$ grains and the elongated crystals uniformly dispersed in the grain boundaries of the $ZrO_2$ grains, further progresses of the cracks would be effectively prevented to improve the fracture toughness of the ceramic material.

It is preferred that the elongated crystals have an average length of 2 to 50 $\mu$m with a maximum length up to 70 $\mu$m. When the average length and the maximum length of the elongated crystals are satisfied with the above ranges, it is possible to provide the composite ceramic material having a higher fracture toughness, while minimizing variations of the mechanical strength of the ceramic material. By the way, a fracture strength ($\sigma f$) of a ceramic material can be expressed by Griffith's equation:

$$\sigma f = (1/Y) \times (K_{IC}/c^{1/2})$$

where "Y" is a shape constant, "$K_{IC}$" is a value of fracture toughness, "c" is a fracture-origin size (crack and/or defects of microstructure). For example, pure $Al_2O_3$ ceramics usually show about 3 MPa.m$^{1/2}$ of "$K_{IC}$". It is presumed that an average fracture-origin size of the $Al_2O_3$ ceramics is about 4 $\mu$m. On the other hand, most of the $ZrO_2$ based ceramic materials of the present invention show about 12 MPa.m$^{1/2}$ or more of "$K_{IC}$". When assuming that a pure $Al_2O_3$ ceramic and a $ZrO_2$ based ceramic material of the present invention are of a same mechanical strength ($\sigma f$) and a same shape constant (Y), and the "$K_{IC}$" values of the $Al_2O_3$ ceramic and the $ZrO_2$ based ceramic material are 3 MPa.m$^{1/2}$ and 12 MPa.m$^{1/2}$, respectively, the Griffith's equation teaches that the fracture-origin size of the $ZrO_2$ based ceramic material is 64 $\mu$m. Therefore, when the maximum length of the elongated crystals in the $ZrO_2$ based ceramic material is up to 64 $\mu$m, it is presumed that the third phase may not behave as the fracture origin. Results of the attached Examples follow this presumption well. From observations of fracture origins of the present ceramic materials, it is preferred that the maximum length of the elongated crystals is up to about 70 $\mu$m to prevent the behavior of the third phase as the fracture origin. In addition, it is preferred that an average aspect ratio of the elongated crystals is within a range of 2 to 25. The aspect ratio is defined as a ratio of length to width of the elongated crystals.

It is also preferred that fine $Al_2O_3$ grains having an average grain size of 1 $\mu$m or less are dispersed within the $ZrO_2$ grains of the first phase at a dispersion ratio of at least 2% to form a nano-composite structure in the ceramic material. The dispersion ratio is defined as a ratio of the number of $Al_2O_3$ grains dispersed within the $ZrO_2$ grains relative to the number of the entire $Al_2O_3$ grains dispersed in the ceramic material. The nano-composite structure with the dispersion ratio of at least 2% further improves the mechanical properties of the ceramic material. In addition, a residual stress field is generated around each of the $Al_2O_3$ grains dispersed within the $ZrO_2$ grains by a mismatch of thermal expansion coefficients between $ZrO_2$ and $Al_2O_3$, so that the $ZrO_2$ grains can be remarkably reinforced. It is further preferred that fine $ZrO_2$ grains having an average grain size of 1 $\mu$m or less are partly dispersed within the elongated crystals of the third phase and/or within relatively large $Al_2O_3$ grains, in order to obtain a nano-composite structure in the ceramic material. This nano-composite structure further improves the mechanical properties of the ceramic material.

It is preferred that 0.05 to 4 mol % of $TiO_2$ is dissolved into the $ZrO_2$ grains of the first phase. In a $ZrO_2$—$TiO_2$ phase diagram, it is well known that tetragonal $ZrO_2$ forms a solid solution with up to about 18 mol % of $TiO_2$ at a high temperature. $TiO_2$ is capable of keeping the tetragonal $ZrO_2$ metastably at a room temperature as well as $Y_2O_3$ and $CeO_2$, and enhancing a grain growth of $ZrO_2$. Therefore, when an excess amount of $TiO_2$ is added to $ZrO_2$, the mechanical strength of the ceramic material will decrease because of an abnormal grain growth of $ZrO_2$. When the $TiO_2$ content is within the above range, it is possible to bring about a controlled grain growth of the $ZrO_2$ grains to form the nano-composite structure explained above. That is, when the $TiO_2$ content is less than 0.05 mol %, a required grain growth of $ZrO_2$ for forming the nano-composite structure is not achieved. When the $TiO_2$ content is more than 4 mol %, the abnormal grain growth of $ZrO_2$ happens. In a method of producing the ceramic material of the present invention, a part of $CeO_2$ dissolved into the $ZrO_2$ grains is used to form the complex oxide of the third phase during a sintering step. This loss of $CeO_2$ can be made up with the addition of $TiO_2$.

The $ZrO_2$ based ceramic material of the present invention can be produced in accordance with the following method. That is, a first constituent corresponding to a composition of 8 to 12 mol % of $CeO_2$, 0.01 to 0.1 mol % of one of MgO and CaO, and the balance of $ZrO_2$ is mixed with a second constituent for forming $Al_2O_3$, to obtain a mixed powder. It is preferred that the first constituent is provided with a powder having a specific surface area of 10 to 30 m$^2$/g. The mixed power is molded to a green compact having a desired shape. Then, the green compact is sintered in an oxidative atmosphere at a temperature between 1400° C. and 1600° C. under an atmospheric pressure. A reaction of Ce and one of Mg and Ca supplied from the first constituent with Al supplied from the second constituent in the oxidative atmosphere during the sintering form the third phase of the ceramic material. When the composition of the first constituent is used, it is possible to obtain at least 90 vol % of tetragonal $ZrO_2$ in the first phase. As explained above, a part of $CeO_2$ of the first constituent is used to form the complex oxide of the third phase. That is, the part of $CeO_2$ changes to $Ce_2O_3$ at the sintering temperature. In other words, a part of Ce changes from tetravalent to trivalent at the sintering temperature. The rest of $CeO_2$ behaves as the stabilizer of tetragonal $ZrO_2$. On the other hand, most of MgO or CaO of the first constituent reacts with $Ce_2O_3$ in the presence of $Al_2O_3$ grains of the second phase at the sintering temperature to form the complex oxide. That is, the trivalent Ce ions react with Al, O, and Mg or Ca at grain boundaries at the sintering temperature to form the complex oxide. When a small amount of MgO or CaO remains in the $ZrO_2$ grains of the first phase, it may behave as the stabilizer of tetragonal $ZrO_2$.

In the present method, a combination of the above content of MgO or CaO and the sintering temperature range is important to provide the ceramic material having the third phase of the range of 0.5 to 5 by area %. When the sintering temperature is less than 1400° C. and/or the content of MgO or CaO is less than 0.01 mol %, a required amount of the complex oxide can not be formed during the sintering step. When the sintering temperature is more than 1600° C., and/or the content of MgO or CaO is more than 0.1 mol %, there are problems that an abnormal crystal growth of the elongated crystals is caused and an excess amount of the third phase is formed in the ceramic material. These bring about a decrease in the mechanical strength of the ceramic material.

When the composition of the first constituent has 0.05 to 4 mol % of $TiO_2$, a loss of $CeO_2$ in the $ZrO_2$ grains caused by the formation of the complex oxide during the sintering step can be made up with $TiO_2$ capable of behaving as the stabilizer of tetragonal $ZrO_2$. In addition, it has already described that the additive amount of $TiO_2$ is useful to control a grain growth of the $ZrO_2$ grains to form the nano-composite structure in the ceramic material.

When the ceramic material has a relative density of 95% or more after the sintering step, it is preferred that a hot-isostatic pressing (HIP) treatment is performed to the ceramic material in an oxidative atmosphere to remove residual pores and further improve the mechanical properties. For example, a mixture gas of oxygen gas and a rare gas such as argon may be used as the oxidative atmosphere. In particular, it is preferred that the mixture gas contains 5 vol % or more of the oxygen gas.

Any one of the following sub-processes [1] to [5] preferably prepares the first constituent.

In the sub-process [1], a zirconia powder containing $CeO_2$ is mixed with a powder selected from a group of $MgCO_3$, $CaCO_3$, MgO, CaO, $Mg(OH)_2$, and $Ca(OH)_2$, to obtain a first mixed powder. After the first mixed powder is heated to obtain a calcined powder, the calcined powder is milled to obtain the first constituent. It is preferred that the first mixed powder is heated at a temperature of 800° C. to 1000° C. in the air.

In the sub-process [2], a mixture solution containing salts of Zr, Ce, and one of Ca and Mg is prepared, and then an alkali solution is added to the mixture solution to generate a precipitate. After the precipitate is dried and heated to obtain a calcined powder, the calcined powder is milled to obtain the first constituent. It is preferred that the precipitate is heated at a temperature of 800° C. to 1000° C. in the air for several hours.

In the sub-process [3], a zirconia powder containing $CeO_2$ and $TiO_2$ is mixed with a powder selected from a group of $MgCO_3$, $CaCO_3$, MgO, CaO, $Mg(OH)_2$, and $Ca(OH)_2$, to obtain a first mixed powder. The first mixed powder is dried and heated to obtain a calcined powder, and then the calcined powder is milled to obtain the first constituent. It is preferred that the first mixed powder is heated at a temperature of 800° C. to 1000° C. in the air for several hours.

In the sub-process [4], a mixture solution containing salts of Zr, Ce, Ti, and one of Ca and Mg is prepared, and then an alkali solution is added to the mixture solution to generate a precipitate. The precipitate is dried and heated to obtain a calcined powder, and then the calcined powder is milled to obtain the first constituent. It is preferred that the precipitate is heated at a temperature of 800° C. to 1000° C. in the air for several hours.

In the sub-process [5], a mixture solution containing salts of Zr, Ce, one of Ca and Mg, and an alkoxide of Ti, is prepared, and then an alkali solution is added to the mixture solution to generate a precipitate. After the precipitate is dried and heated to obtain a calcined powder, the calcined powder is milled to obtain the first constituent. It is preferred that the precipitate is heated at a temperature of 800° C. to 1000° C. in the air for several hours.

In the sub-processes [1] to [5], a dry or wet ball-mill may be used for the powder mixing and/or the milling of the calcined powder. When adopting the wet ball-mill, it is preferred to use ethanol, acetone, toluene, or the like as a solvent.

Any one of the following sub-processes [6] and [7] preferably prepares the second constituent.

In the sub-process [6], an aqueous solution of an aluminum salt is prepared, and then an alkali solution such as aqueous ammonia is added to the aqueous solution to obtain a precipitation. The precipitation is dried and heated at a temperature of about 800° C. in the air for several hours to obtain a calcined powder. The calcined powder is milled to obtain an $Al_2O_3$ powder as the second constituent.

In the sub-process [7], an organic solution of an aluminum alkoxide is prepared, and then the aluminum alkoxide is hydrolyzed to obtain a precipitation. The precipitation is dried and heated at a temperature of about 800° C. in the air for several hours to obtain a calcined powder. The calcined powder is milled to obtain an $Al_2O_3$ powder as the second constituent.

It is also preferred to use as the second constituent a powder of $\alpha$-$Al_2O_3$ having an average grain size of 0.5 $\mu$m or less or a powder of $\gamma Al_2O_3$ having a specific surface area of 100 $m^2$/g or more. In particular, when using the $\gamma$-$Al_2O_3$ powder, it is preferred that the following sub-processes prepare the mixed powder. That is, the first constituent is mixed with the $\gamma Al_2O_3$ powder to obtain a first mixed powder. The first mixed powder is dried and heated at a temperature of 1000° C. or more and less than the sintering temperature to obtain a calcined powder, and then the calcined powder is milled to obtain the mixed powder.

In addition, the following sub-process [8] or [9] preferably prepares the mixed powder. That is, in the sub-process [8], the first constituent is mixed with an aqueous solution of an aluminum salt to obtain a mixture solution. It is preferred to use the first constituent prepared by any one of the sub-processes [1] to [5]. An alkali solution such as aqueous ammonia is added to the mixture solution to obtain a mixture of the first constituent and a precipitation of aluminum hydroxide. After the mixture is dried and heated to obtain a calcined powder, the calcined powder is milled to obtain the mixed powder. It is preferred that the mixture is heated at a temperature of 800° C. in the air for several hours.

In the sub-process [9], the first constituent is mixed with an organic solution of an aluminum alkoxide to obtain a mixture solution. It is preferred to use the first constituent prepared by any one of the sub-processes [1] to [5]. The aluminum alkoxide of the mixture solution is hydrolyzed to obtain a mixture of the first constituent and a precipitation of aluminum hydroxide. After the mixture is dried and heated to obtain a calcined powder, the calcined powder is milled to obtain the mixed powder. It is preferred that the mixture is heated at a temperature of 800° C. in the air for several hours.

EXAMPLES 1 TO 18

A $ZrO_2$ based ceramic material of Example 1 was produced by the following method. A $ZrO_2$ powder containing $CeO_2$ and having a specific surface area of 15 $m^2$/g was ball-milled with a MgO powder having an average grain size of 0.3 $\mu$m in the presence of ethanol for 24 hours by the use of balls made of tetragonal $ZrO_2$ and a polyethylene vessel. The resultant is then dried to obtain a first mixture as a first constituent. The contents of $CeO_2$ and MgO in the first mixture are 8 mol % and 0.01 mol % relative to $ZrO_2$, respectively. The first mixture was heated at 950° C. in the air for 3 hours to obtain a calcined powder. The calcined powder was ball-milled with an $\alpha$-$Al_2O_3$ powder (purity: more than 99.9%) having an average grain size of 0.2 $\mu$m as a second constituent in the presence of ethanol for 24 hours by the use of the tetragonal $ZrO_2$ balls and the polyethylene vessel. The resultant is then dried to obtain a second mixture. An amount of the $\alpha$-$Al_2O_3$ powder in the second mixture is determined such that when all of Al (aluminum) included in the ceramic material is converted to $Al_2O_3$, an $Al_2O_3$ content in the ceramic material is 30 vol %. The second mixture was molded into a disk having a diameter of 60 mm and a thickness of 5 mm by means of a uni-axis press molding and cold isostatic pressing (CIP) treatment. The disk was sintered at 1500° C. in the air for 2 hours under an atmospheric pressure to obtain the $ZrO_2$ based ceramic material of Example 1. Each of ceramic materials of Examples 2 to 17 was produced in accordance with a substantially same method as Example 1 except for using a first constituent having a different composition of $CeO_2$ and MgO or CaO, as listed in Table 1.

Figure 2:
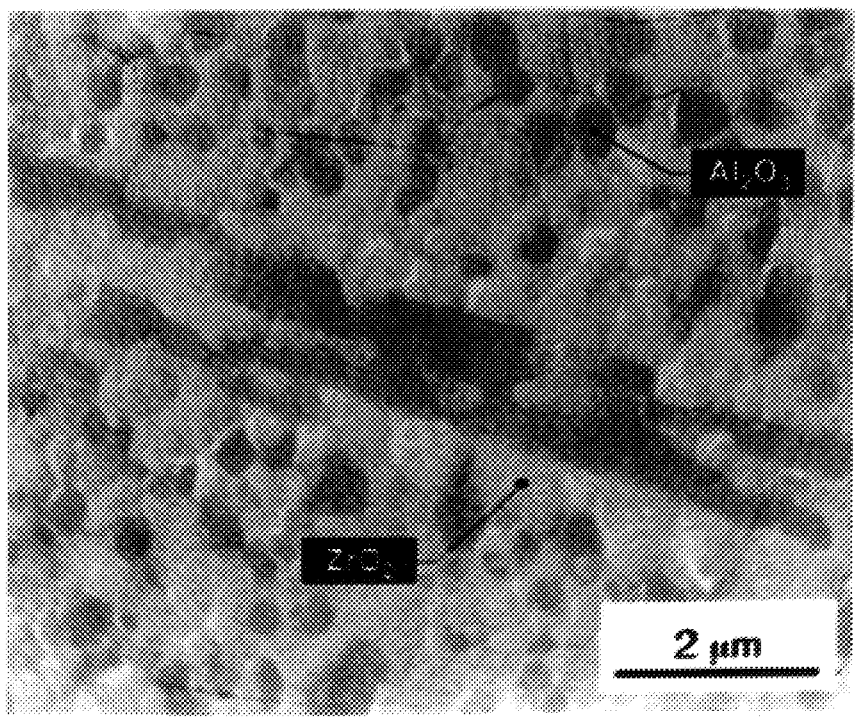
FIG. 2 is a scanning electron micrograph of an elongated crystal formed in the ceramic material.
Figure 3:
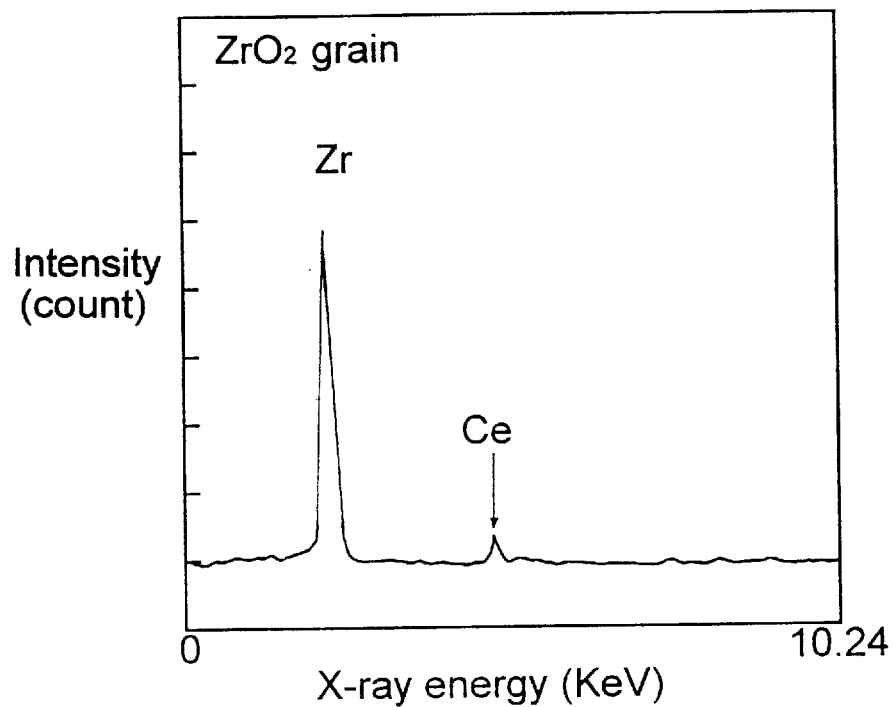
FIG. 3 is a chart of an energy dispersive X-ray analysis (EDAX) of a $ZrO_2$ grain of the ceramic material of Example 5.
Figure 4:
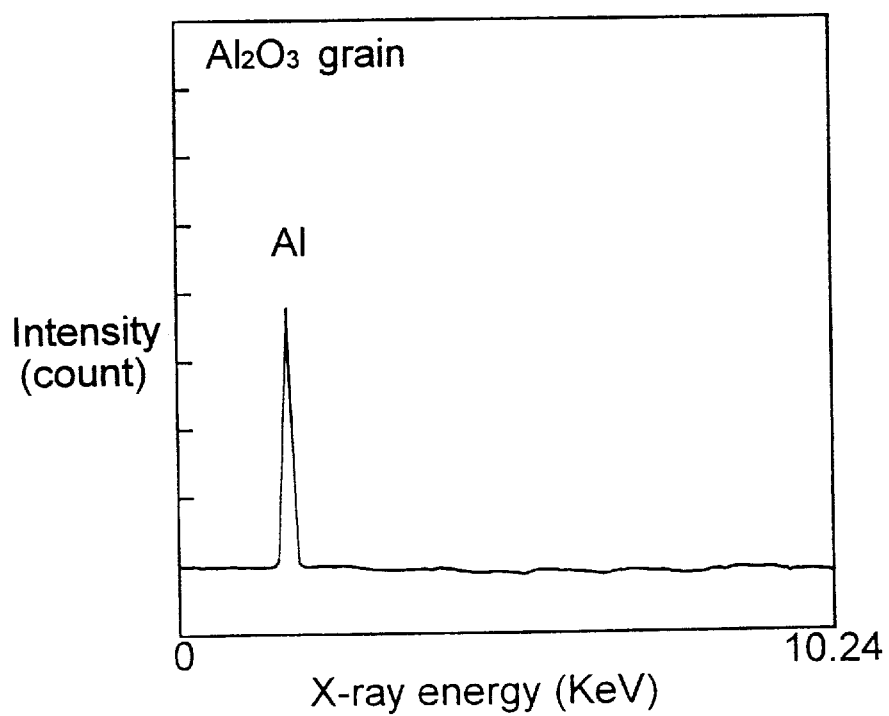
FIG. 4 is a chart of the energy dispersive X-ray analysis (EDAX) of an $Al_2O_3$ grain of the ceramic material.
Figure 5:
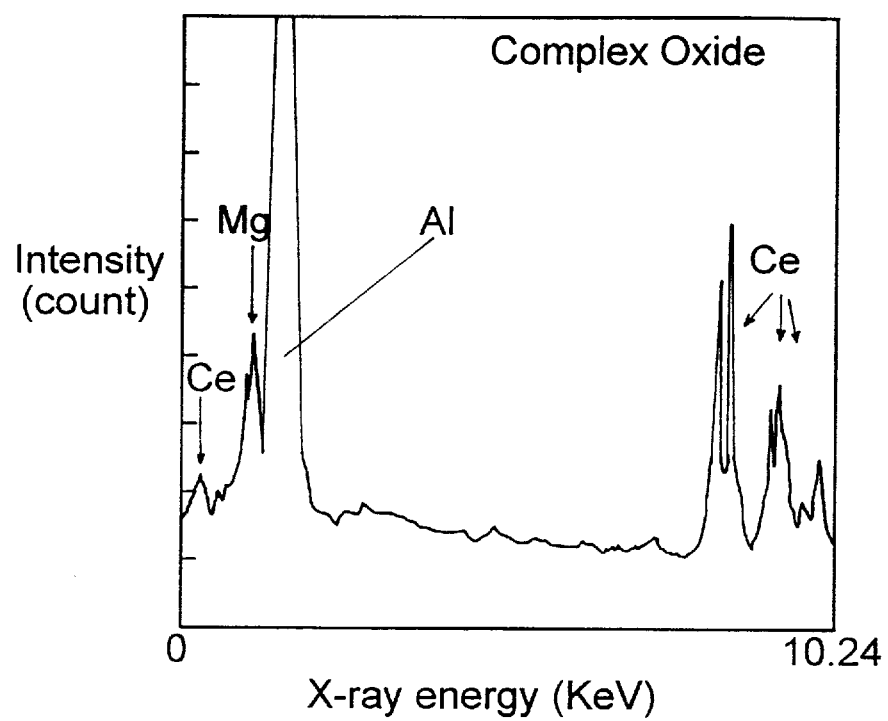
FIG. 5 is a chart of the energy dispersive X-ray analysis (EDAX) of an elongated crystal of a complex oxide of the ceramic material.

Each of the ceramic materials of Examples 1 to 18 was sufficiently densified by the sintering. By the use of a scanning electron microscope (SEM) and a transmission electron microscope (TEM), it is observed that the ceramic material is composed of a $ZrO_2$ grain phase, $\alpha$-$Al_2O_3$ grain phase, and an elongated crystal phase of a complex oxide formed by a reaction of Ce and Mg or Ca supplied from the first mixture with Al supplied from the $\alpha$-$Al_2O_3$ powder in the oxidative atmosphere at the sintering temperature, as shown in FIGS. 1 and 2. In FIG. 1, arrows designate the elongated crystals dispersed in the ceramic material of Example 5. As an example, charts of energy dispersive X-ray analysis of a $ZrO_2$ grain, $\alpha$-$Al_2O_3$ grain, and an elongated crystal of the ceramic material of Example 5 are shown in FIGS. 3 to 5. FIG. 3 shows that $CeO_2$ is dissolved into the $ZrO_2$ grain. FIG. 5 shows that the elongated crystal contains Ce, Mg and Al. It is presumed that a composition of this elongated crystal is $CeMgAl_{11}O_{19}$. A content of the elongated crystal phase in the ceramic material is presented by an area ratio (area %). That is, the area ratio (area %) of the elongated crystal phase is determined by the following equation;

Area ratio (Area %)=$(t/T) \times 100$ where "T" is a total area of an observation region of a polished and heat-treated surface of the ceramic material observed by SEM, or a total area of an observation region of the ceramic material observed by TEM, and "t" is a total area of the elongated crystals exposed on the observation region of ceramic material. In Examples 1 to 18, the area ratio is within a range of 0.6 to 3.2 area %, an average length of the elongated crystals is within a range of 5.0 to 25.8 μm, and an average aspect ratio of the elongated crystals is within a range of 5.0 to 19.2. Minimum and maximum lengths of the elongated crystals are 2.0 μm and 42.6 μm, respectively. These results are listed in Table 2.

Figure 6:
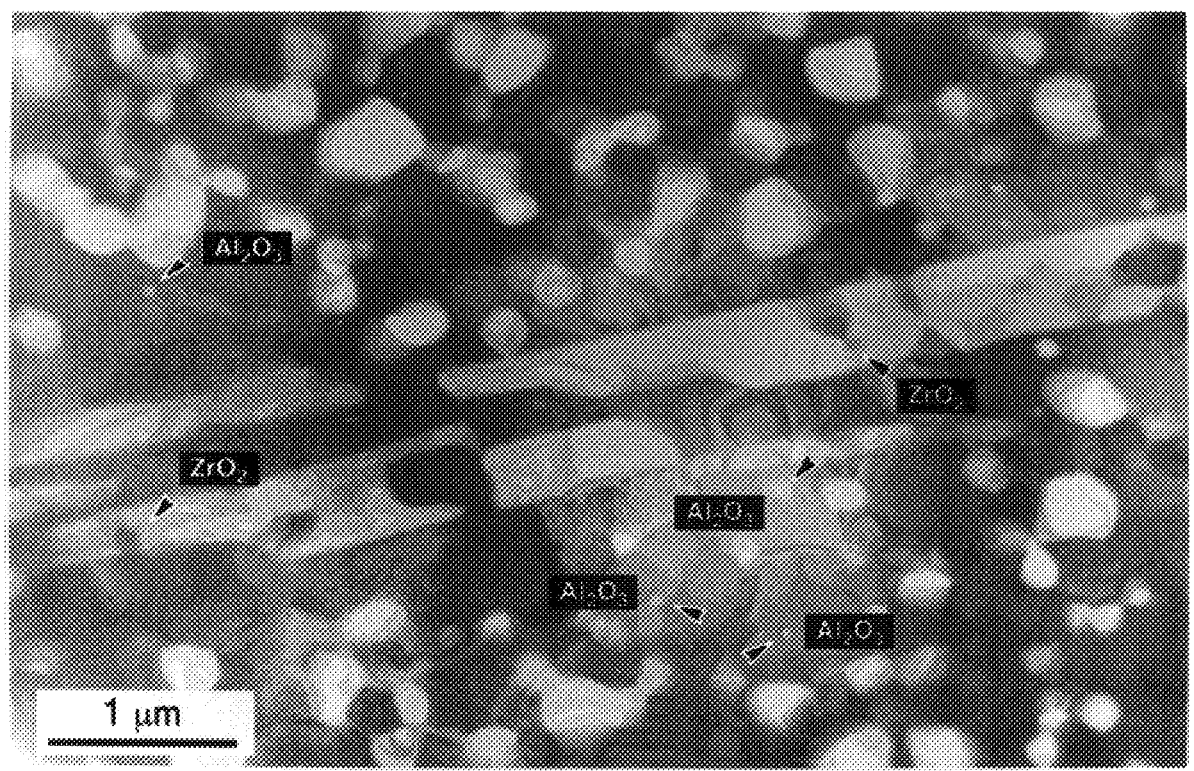
FIG. 6 is a transmission electron micrograph of the ceramic material of Example 5.
Figure 7:
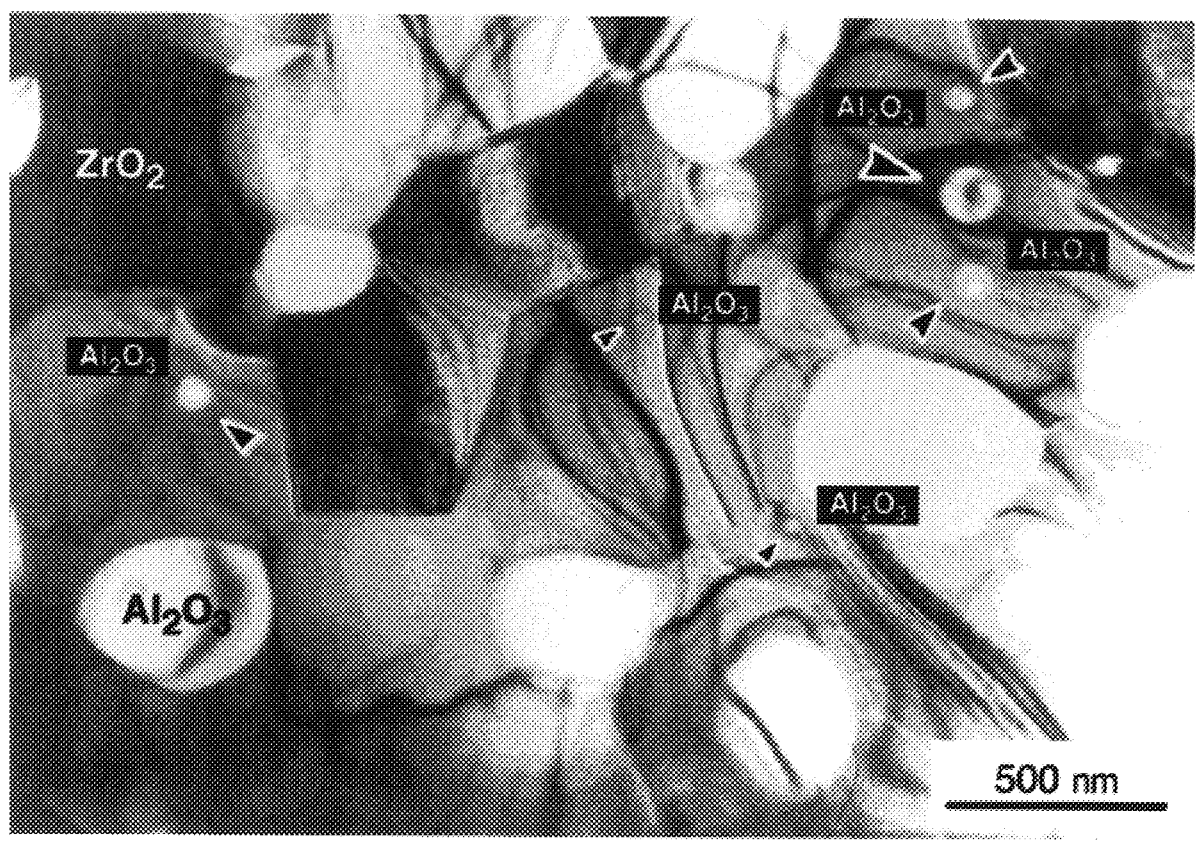
FIG. 7 is a transmission electron micrograph of the ceramic material.

As shown in FIG. 2, average grain sizes of the $ZrO_2$ grain phase and the $\alpha$-$Al_2O_3$ grain phase of the ceramic material of FIG. 5 are 1.3 μm and 0.9 μm, respectively. As listed in Table 1, the average grain size of the $ZrO_2$ grain phase in Examples 1 to 18 is within a range of 0.8 to 1.3 μm. The average grain size of the $\alpha$-$Al_2O_3$ grain phase is less than 1 μm in Examples 1 to 18. TEM photographs of the ceramic material of Example 5 are shown in FIGS. 6 and 7. These TEM photographs shows that fine $Al_2O_3$ grains having an average grain size of 1 μm or less are dispersed within $ZrO_2$ grains, and fine $ZrO_2$ grains are partly dispersed within the elongated crystals of the complex oxide. In another TEM observation, it is confirmed that fine $ZrO_2$ grains are is partly dispersed within relatively large $\alpha$-$Al_2O_3$ grains. A dispersion ratio (W %) of fine $\alpha$-$Al_2O_3$ grains dispersed within the $ZrO_2$ grains is represented by the following equation:

$$W(\%) = (n/S) \times 100,$$

where "S" is the number of the entire $Al_2O_3$ grains dispersed at an observation region in the ceramic material, and "n" is the number of $Al_2O_3$ grains dispersed within the $ZrO_2$ grains at the observation region. The numbers "S" and "n" can be counted by the use of TEM and/or SEM. In Examples 1 to 18, the dispersion ratio is within a range of 2.1 to 2.3.

Quantification of tetragonal $ZrO_2$ in the $ZrO_2$ grain phase was carried out by X-ray diffraction analysis. In Tables of this specification, the following classification of $ZrO_2$ crystal phases is used. That is, when a content of monoclinic $ZrO_2$ in the $ZrO_2$ grain phase is 30 vol % or more, it is designated as "M". When a content of tetragonal $ZrO_2$ in the $ZrO_2$ grain phase is within a range of 90 vol % to less than 95 vol %, and the balance is monoclinic $ZrO_2$, it is designated as "T+M". When the content of tetragonal $ZrO_2$ is within a range of 95 vol % or more, and the balance is monoclinic $ZrO_2$, it is designated as "T". In addition, when the content of tetragonal $ZrO_2$ is within a range of 90 vol % or more, and the balance is cubic $ZrO_2$, it is designated as "T+C". Results are listed in Table 1.

To estimate a mechanical strength of the ceramic material, a 3-point bending strength was measured according to the test method of JIS (Japanese Industrial Standard) R1601. To prepare specimens of 4 ×3×40 mm for the 3-point bending test, the ceramic material was cut, ground, and polished. In addition, fracture toughness of the ceramic material was measured in accordance with IF method. Those results are listed in Table 2

TABLE 1

| | Starting material | | | | $ZrO_2$ Based Ceramic Material | | |
|---|---|---|---|---|---|---|---|
| | 1st constituent (mol %) | | | 2nd constituent (vol %) | Average Grain Size (μm) | | $ZrO_2$ Crystal |
| | $CeO_2$ | MgO | CaO | $Al_2O_3$ | $ZrO_2$ | $Al_2O_3$ | Phase |
| Example 1 | 8 | 0.01 | 0 | 30 | 1.3 | 0.9 | T + M |
| Example 2 | 8 | 0.05 | 0 | 30 | 1.3 | 0.9 | T + M |
| Example 3 | 8 | 0.1 | 0 | 30 | 1.3 | 0.9 | T + M |
| Example 4 | 8 | 0 | 0.01 | 30 | 1.3 | 0.9 | T + M |
| Example 5 | 8 | 0 | 0.05 | 30 | 1.3 | 0.9 | T + M |
| Example 6 | 8 | 0 | 0.1 | 30 | 1.3 | 0.9 | T + M |
| Example 7 | 10 | 0.01 | 0 | 30 | 0.8 | 0.4 | T |
| Example 8 | 10 | 0.05 | 0 | 30 | 0.8 | 0.4 | T |
| Example 9 | 10 | 0.1 | 0 | 30 | 0.8 | 0.4 | T |
| Example 10 | 10 | 0 | 0.01 | 30 | 0.8 | 0.4 | T |
| Example 11 | 10 | 0 | 0.05 | 30 | 0.8 | 0.4 | T |
| Example 12 | 10 | 0 | 0.1 | 30 | 0.8 | 0.4 | T |
| Example 13 | 12 | 0.01 | 0 | 30 | 0.9 | 0.4 | T |
| Example 14 | 12 | 0.05 | 0 | 30 | 0.9 | 0.4 | T |
| Example 15 | 12 | 0.1 | 0 | 30 | 0.9 | 0.4 | T |
| Example 16 | 12 | 0 | 0.01 | 30 | 0.9 | 0.4 | T |
| Example 17 | 12 | 0 | 0.05 | 30 | 0.9 | 0.4 | T |
| Example 18 | 12 | 0 | 0.1 | 30 | 0.9 | 0.4 | T |

TABLE 2

| | Bending Strength (MPa) | Fracture Toughness (MPa · $m^{1/2}$) | Dispersion Ratio of $Al_2O_3$ (%) | Area Ratio of Complex Oxide (area %) | Average Length of Complex oxide [Min.–Max.] (μm) | Average Aspect Ratio of Complex Oxide [Min.–Max.] |
|---|---|---|---|---|---|---|
| Example 1 | 580 | 22.8 | 2.1 | 0.7 | 5.2 [2.0–11.6] | 5.3 [2.0–9.7] |
| Example 2 | 630 | 22.6 | 2.1 | 1.7 | 14.3 [5.4–25.6] | 13.8 [5.2–18.7] |
| Example 3 | 670 | 22.3 | 2.1 | 3.1 | 24.2 [8.2–39.6] | 17.6 [6.4–22.6] |
| Example 4 | 550 | 22.6 | 2.1 | 0.7 | 5.3 [2.1–11.4] | 5.2 [2.2–9.6] |
| Example 5 | 600 | 22.2 | 2.1 | 1.6 | 14.7 [6.1–25.9] | 12.7 [4.7–18.5] |
| Example 6 | 660 | 22.0 | 2.1 | 3.0 | 23.6 [7.6–41.6] | 18.1 [6.5–23.5] |
| Example 7 | 780 | 19.8 | 2.2 | 0.7 | 5.1 [2.4–11.7] | 5.3 [2.3–9.9] |
| Example 8 | 850 | 19.4 | 2.2 | 1.7 | 14.0 [5.2–24.3] | 14.1 [6.1–19.1] |
| Example 9 | 940 | 19.1 | 2.2 | 3.2 | 25.2 [7.6–37.6] | 19.2 [6.2–22.9] |
| Example 10 | 750 | 19.6 | 2.2 | 0.6 | 5.0 [2.1–11.2] | 5.4 [2.1–10.7] |
| Example 11 | 810 | 19.3 | 2.2 | 1.6 | 13.9 [4.7–27.2] | 13.5 [5.0–18.7] |
| Example 12 | 880 | 19.0 | 2.2 | 3.1 | 24.8 [6.5–34.6] | 18.4 [6.5–23.8] |
| Example 13 | 790 | 17.8 | 2.3 | 0.7 | 5.3 [2.2–11.5] | 5.0 [2.0–8.7] |
| Example 14 | 880 | 17.0 | 2.3 | 1.7 | 15.1 [5.2–23.4] | 12.9 [4.5–17.9] |

TABLE 2-continued

|  | Bending Strength (MPa) | Fracture Toughness (MPa · m$^{1/2}$) | Dispersion Ratio of Al$_2$O$_3$ (%) | Area Ratio of Complex Oxide (area %) | Average Length of Complex oxide [Min.–Max.] ($\mu$m) | Average Aspect Ratio of Complex Oxide [Min.–Max.] |
|---|---|---|---|---|---|---|
| Example 15 | 960 | 16.3 | 2.3 | 3.1 | 25.8 [8.1–42.6] | 18.4 [5.6–23.7] |
| Example 16 | 770 | 17.6 | 2.3 | 0.7 | 5.3 [2.1–11.8] | 4.8 [2.3–7.6] |
| Example 17 | 830 | 16.5 | 2.3 | 1.5 | 14.4 [4.4–26.8] | 13.3 [4.1–18.6] |
| Example 18 | 900 | 15.8 | 2.3 | 3.1 | 22.9 [7.2–40.1] | 16.3 [4.9–24.1] |

Examples 19 to 46 and Comparative Examples 1 to 4

A ZrO$_2$ based ceramic material of Example 19 was produced by the following method. A ZrO$_2$ powder containing CeO$_2$ and having a specific surface area of 15 m$^2$/g, was ball-milled with a MgO powder having an average grain size of 0.3 $\mu$m and a TiO$_2$ powder having an average grain size of 0.3 $\mu$m in the presence of ethanol for 24 hours by the use of balls made of tetragonal ZrO$_2$ and a polyethylene vessel. The resultant is then dried to obtain a first mixture as a first constituent. The contents of CeO$_2$, TiO$_2$, and MgO in the first mixture are 8 mol %, 1 mol %, and 0.01 mol % relative to ZrO$_2$, respectively. The first mixture was heated at 950° C. in the air for 3 hours to obtain a calcined powder. The calcined powder was ball-milled with an $\alpha$-Al$_2$O$_3$ powder having an average grain size of 0.2 $\mu$m as a second constituent in the presence of ethanol for 24 hours by the use of the tetragonal ZrO$_2$ balls and the polyethylene vessel. The resultant is then dried to obtain a second mixture. An amount of the $\alpha$-Al$_2$O$_3$ powder in the second mixture is determined such that when all of Al included in the ceramic material is converted to Al$_2$O$_3$, an Al$_2$O$_3$ content in the ceramic material is 30 vol %. The second mixture was molded into a disk having a diameter of 60 mm and a thickness of 5 mm by means of a uni-axis press molding and cold isostatic pressing (CIP) treatment. The disk was sintered at 1500° C. in the air for 2 hours under an atmospheric pressure to obtain the ZrO$_2$ based ceramic material of Example 19. Each of ceramic materials of Examples 20 to 46 and Comparative Examples 1 to 4 was produced in accordance with a substantially same method as Example 19 except for using a first constituent having a different composition of CeO$_2$, TiO$_2$, and MgO or CaO, as listed in Tables 3 and 4.

Each of the ceramic materials of Examples 19 to 46 was sufficiently densified by the sintering. By the use of a scanning electron microscope (SEM) and/or a transmission electron microscope (TEM), it is observed that each of the ceramic materials is composed of a ZrO$_2$ grain phase, $\alpha$-Al$_2$O$_3$ grain phase, and an elongated crystal phase of a complex oxide of Ce, Al, and Mg or Ca. An area ratio of the elongated crystal phase in the ceramic material was measured according to the same manner as Example 1. In Examples 19 to 46, the area ratio is within a range of 0.6 to 3.3 area %, an average length of the elongated crystals is within a range of 4.8 to 26.7 $\mu$m, and an average aspect ratio of the elongated crystals is within a range of 4.6 to 17.6. Minimum and maximum lengths of the elongated crystals are 2.0 $\mu$m and 41.5 $\mu$m, respectively. These results are listed in Tables 5 and 6.

The average grain sizes of the ZrO$_2$ grain phase and the $\alpha$-Al$_2$O$_3$ grain phase of the ceramic material in Examples 19 to 46 are within a range of 0.9 to 4.2 $\mu$m, and less than 2 $\mu$m, respectively. These results are listed in Tables 3 and 4. From TEM and SEM observations, it is confirmed that fine Al$_2$O$_3$ grains having an average grain size of 1 $\mu$m or less are dispersed within ZrO$_2$ grains, and fine ZrO$_2$ grains are dispersed within relatively long crystals of the complex oxide and relatively large $\alpha$-Al$_2$O$_3$ grains. In addition, there is a tendency that as the additive amount of TiO$_2$ is greater, the average grain size of the ZrO$_2$ increases irrespective of the additive amounts of CeO$_2$ and MgO or CaO. A dispersion ratio (W %) of fine $\alpha$-Al$_2$O$_3$ grains dispersed within the ZrO$_2$ grains was measured according to the same manner as Example 1. In Examples 19 to 46, the dispersion ratio is within a range of 2.5 to 4.6.

Mechanical strength and fracture toughness of the ceramic material were measured in accordance with the same methods as Example 1. Those results are listed in Tables 5 and 6. Furthermore, quantification of tetragonal ZrO$_2$ in the ZrO$_2$ grain phase was carried out by X-ray diffraction analysis. As listed in Tables 3 and 4, a content of tetragonal ZrO$_2$ in the ZrO$_2$ grain phase in Examples 19 to 22 is within a range of 90 vol % to less than 95 vol %, and the balance is monoclinic ZrO$_2$. On the other hand, the content of tetragonal ZrO$_2$ in the ZrO$_2$ grain phase in Examples 23 to 46 is within a range of 95 vol % or more, and the balance is monoclinic ZrO$_2$.

In the ceramic material of Comparative Example 1, it is observed that a large number of micro-cracks develop during a cooling step from the sintering temperature due to a large tetragonal-to-monoclinic phase transformation. As a result, the mechanical properties of the ceramic material were not measured. By X-ray diffraction analysis, it was identified that a content of monoclinic ZrO$_2$ in the ZrO$_2$ grain phase reaches about 80 vol %. As to the ceramic material of Comparative Example 2, an abnormal grain growth of ZrO$_2$ up to about 10 $\mu$m is often observed in the ceramic material. In addition, it is observed that a lot of residual pores are left within the ZrO$_2$ grains and at triple points of the ZrO$_2$ grains. By X-ray diffraction analysis, it is confirmed that the ZrO$_2$ grain phase is formed with tetragonal ZrO$_2$ and cubic ZrO$_2$. It is presumed that these structural defects were caused by the addition of an excess amount of TiO$_2$. As to the ceramic material of Comparative Example 3, since a large amount of MgO is included in the first constituent, a crystal growth of the elongated crystal phase is enhanced, so that the average mechanical strength of the ceramic material decreases. As to the ceramic material of Comparative Example 4, since neither MgO nor CaO is included in the first constituent, the elongated crystal phase is not formed in the ceramic material, so that the fracture toughness lowers.

TABLE 3

| | Starting material | | | | | ZrO₂ Based Ceramic Material | | |
|---|---|---|---|---|---|---|---|---|
| | 1st constituent (mol %) | | | | 2nd constituent (vol %) | Average Grain Size (μm) | | ZrO₂ Crystal |
| | CeO₂ | MgO | CaO | TiO₂ | Al₂O₃ | ZrO₂ | Al₂O₃ | Phase |
| Example 19 | 8 | 0.01 | 0 | 1 | 30 | 1.6 | 1 | T + M |
| Example 20 | 8 | 0.1 | 0 | 1 | 30 | 1.6 | 1 | T + M |
| Example 21 | 8 | 0 | 0.01 | 1 | 30 | 1.6 | 1 | T + M |
| Example 22 | 8 | 0 | 0.1 | 1 | 30 | 1.6 | 1 | T + M |
| Example 23 | 8 | 0.01 | 0 | 4 | 30 | 4.2 | 1.8 | T |
| Example 24 | 8 | 0.1 | 0 | 4 | 30 | 4.2 | 1.8 | T |
| Example 25 | 8 | 0 | 0.01 | 4 | 30 | 4.2 | 1.8 | T |
| Example 26 | 8 | 0 | 0.1 | 4 | 30 | 4.2 | 1.8 | T |
| Example 27 | 10 | 0.01 | 0 | 0.05 | 30 | 0.9 | 0.4 | T |
| Example 28 | 10 | 0.1 | 0 | 0.05 | 30 | 0.9 | 0.4 | T |
| Example 29 | 10 | 0 | 0.01 | 0.05 | 30 | 0.9 | 0.4 | T |
| Example 30 | 10 | 0 | 0.1 | 0.05 | 30 | 0.9 | 0.4 | T |
| Example 31 | 10 | 0.01 | 0 | 1 | 30 | 1.4 | 0.6 | T |
| Example 32 | 10 | 0.1 | 0 | 1 | 30 | 1.4 | 0.6 | T |
| Example 33 | 10 | 0 | 0.01 | 1 | 30 | 1.4 | 0.6 | T |
| Example 34 | 10 | 0 | 0.1 | 1 | 30 | 1.4 | 0.6 | T |
| Example 35 | 10 | 0.01 | 0 | 4 | 30 | 3.8 | 1.4 | T |
| Example 36 | 10 | 0.1 | 0 | 4 | 30 | 3.8 | 1.4 | T |
| Example 37 | 10 | 0 | 0.01 | 4 | 30 | 3.8 | 1.4 | T |

TABLE 4

| | Starting material | | | | | ZrO₂ Based Ceramic Material | | |
|---|---|---|---|---|---|---|---|---|
| | 1st constituent (mol %) | | | | 2nd constituent (vol %) | Average Grain Size (μm) | | ZrO₂ Crystal |
| | CeO₂ | MgO | CaO | TiO₂ | Al₂O₃ | ZrO₂ | Al₂O₃ | Phase |
| Example 38 | 10 | 0 | 0.1 | 4 | 30 | 3.8 | 1.4 | T |
| Example 39 | 12 | 0.01 | 0 | 0.2 | 30 | 1.1 | 0.5 | T |
| Example 40 | 12 | 0.1 | 0 | 0.2 | 30 | 1.1 | 0.5 | T |
| Example 41 | 12 | 0 | 0.01 | 0.2 | 30 | 1.1 | 0.5 | T |
| Example 42 | 12 | 0 | 0.1 | 0.2 | 30 | 1.1 | 0.5 | T |
| Example 43 | 12 | 0.01 | 0 | 4 | 30 | 3.7 | 1.3 | T |
| Example 44 | 12 | 0.1 | 0 | 4 | 30 | 3.7 | 1.3 | T |
| Example 45 | 12 | 0 | 0.01 | 4 | 30 | 3.7 | 1.3 | T |
| Example 46 | 12 | 0 | 0.1 | 4 | 30 | 3.7 | 1.3 | T |
| Comparative Example 1 | 6 | 0.1 | 0 | 1 | 30 | — | — | T + M |
| Comparative Example 2 | 12 | 0 | 0.05 | 8 | 30 | 7.3 | 3.6 | T + C |
| Comparative Example 3 | 10 | 2 | 0 | 1 | 30 | 1.4 | 0.6 | T |
| Comparative Example 4 | 12 | 0 | 0 | 4 | 30 | 4.3 | 1.5 | T |

TABLE 5

| | Bending Strength (MPa) | Fracture Toughness (MPa·m^{1/2}) | Dispersion Ratio of Al₂O₃ (%) | Area Ratio of Complex Oxide (area %) | Average Length of Complex oxide [Min.–Max.] (μm) | Average Aspect Ratio of Complex Oxide [Min.–Max.] |
|---|---|---|---|---|---|---|
| Example 19 | 630 | 22.4 | 3.1 | 0.6 | 5.2 [2.0–11.5] | 5.1 [2.0–8.8] |
| Example 20 | 720 | 21.8 | 3.1 | 3.2 | 24.2 [8.9–37.5] | 17.6 [6.2–22.6] |
| Example 21 | 610 | 22.2 | 3.1 | 0.7 | 5.2 [2.2–11.6] | 5.3 [2.2–9.7] |
| Example 22 | 700 | 21.6 | 3.1 | 3.0 | 23.8 [8.2–39.5] | 17.6 [6.4–21.6] |
| Example 23 | 570 | 18.2 | 4.5 | 0.6 | 5.1 [2.3–12.1] | 4.8 [2.3–10.3] |
| Example 24 | 660 | 15.1 | 4.5 | 3.1 | 24.6 [8.2–38.7] | 17.3 [6.2–23.2] |
| Example 25 | 560 | 17.7 | 4.5 | 0.7 | 5.3 [2.1–11.3] | 5.7 [2.0–8.8] |
| Example 26 | 630 | 14.4 | 4.5 | 3.0 | 25.1 [8.2–36.1] | 17.1 [6.8–24.3] |

TABLE 5-continued

|  | Bending Strength (MPa) | Fracture Toughness (MPa · m$^{1/2}$) | Dispersion Ratio of Al$_2$O$_3$ (%) | Area Ratio of Complex Oxide (area %) | Average Length of Complex oxide [Min.–Max.] (μm) | Average Aspect Ratio of Complex Oxide [Min.–Max.] |
|---|---|---|---|---|---|---|
| Example 27 | 920 | 19.6 | 2.5 | 0.7 | 4.8 [2.0–10.8] | 5.5 [2.2–9.6] |
| Example 28 | 1160 | 18.8 | 2.5 | 3.2 | 25.3 [8.2–40.6] | 16.8 [6.0–21.1] |
| Example 29 | 870 | 19.4 | 2.5 | 0.6 | 5.0 [2.4–13.2] | 4.7 [2.1–9.5] |
| Example 30 | 1100 | 18.6 | 2.5 | 3.1 | 26.7 [8.2–37.6] | 16.9 [6.2–20.6] |
| Example 31 | 870 | 18.9 | 3.4 | 0.7 | 4.9 [2.6–11.5] | 5.1 [2.3–10.1] |
| Example 32 | 1100 | 17.7 | 3.4 | 3.2 | 22.9 [8.2–39.8] | 17.2 [6.5–21.8] |
| Example 33 | 820 | 18.5 | 3.4 | 0.7 | 5.4 [2.8–14.2] | 5.5 [2.0–8.6] |
| Example 34 | 1060 | 18.0 | 3.4 | 3.1 | 24.5 [8.2–41.5] | 16.4 [6.6–22.2] |
| Example 35 | 830 | 16.7 | 4.5 | 0.7 | 5.5 [2.2–10.7] | 6.0 [2.2–8.9] |
| Example 36 | 1000 | 14.0 | 4.5 | 3.0 | 23.9 [8.2–36.1] | 17.2 [6.8–22.6] |
| Example 37 | 790 | 16.4 | 4.5 | 0.7 | 6.1 [2.5–12.6] | 5.8 [2.1–9.1] |

TABLE 6

|  | Bending Strength (MPa) | Fracture Toughness (MPa · m$^{1/2}$) | Dispersion Ratio of Al$_2$O$_3$ (%) | Area Ratio of Complex Oxide (area %) | Average Length of Complex oxide [Min.–Max.] (μm) | Average Aspect Ratio of Complex Oxide [Min.–Max.] |
|---|---|---|---|---|---|---|
| Example 38 | 920 | 13.9 | 4.5 | 3.1 | 26.3 [8.2–38.5] | 17.6 [6.6–23.5] |
| Example 39 | 910 | 17.2 | 2.6 | 0.7 | 5.2 [2.6–13.5] | 4.6 [2.0–7.9] |
| Example 40 | 1100 | 15.6 | 2.6 | 3.1 | 23.7 [8.2–40.6] | 17.5 [6.1–23.3] |
| Example 41 | 880 | 16.9 | 2.6 | 0.6 | 5.6 [2.2–10.9] | 5.0 [2.3–8.3] |
| Example 42 | 1030 | 15.0 | 2.6 | 3.1 | 22.9 [8.2–37.2] | 16.7 [7.1–23.7] |
| Example 43 | 850 | 14.2 | 4.6 | 0.7 | 5.3 [2.0–11.0] | 5.5 [2.1–9.1] |
| Example 44 | 1020 | 12.5 | 4.6 | 3.3 | 24.7 [8.2–37.8] | 17.3 [6.6–22.1] |
| Example 45 | 820 | 13.8 | 4.6 | 0.7 | 5.2 [2.3–13.4] | 5.8 [2.0–7.9] |
| Example 46 | 950 | 12.3 | 4.6 | 3.2 | 24.2 [8.2–40.9] | 17.4 [6.4–22.7] |
| Comparative Example 1 | — | — | — | — | — | — |
| Comparative Example 2 | 330 | 6.3 | 5.4 | 1.5 | 13.1 [5.5–12.1] | 12.4 [4.6–19.5] |
| Comparative Example 3 | 450 | 9.0 | 3.3 | 7.2 | 41.0 [12.2–75.3] | 21.5 [8.9–30.6] |
| Comparative Example 4 | 530 | 6.6 | 4.6 | — | — | — |

Examples 47 to 51 and Comparative Examples 5 and 6

These Examples and Comparative Examples were produced to investigate an influence of an Al$_2$O$_3$ content in the ceramic material to the mechanical properties. That is, a ZrO$_2$ powder containing CeO$_2$ and having a specific surface area of 15 m$^2$/g was ball-milled with a MgO powder having an average grain size of 0.3 μm and a TiO$_2$ powder having an average grain size of 0.3 μm in the presence of ethanol for 24 hours by the use of balls made of tetragonal ZrO$_2$ and a polyethylene vessel. The resultant is then dried to obtain a first mixture as a first constituent. The contents of CeO$_2$, TiO$_2$, and MgO in the first mixture are 10 mol %, 1 mol %, and 0.05 mol % relative to ZrO$_2$, respectively. The first mixture was heated at 800° C. in the air for 3 hours to obtain a calcined powder. The calcined powder was ball-milled with an α-Al$_2$O$_3$ powder having an average grain size of 0.2 μm as a second constituent in the presence of ethanol for 24 hours by the use of the tetragonal ZrO$_2$ balls and the polyethylene vessel. The resultant is then dried to obtain a second mixture. The second mixtures of Examples 47 to 51 and Comparative Example 6 have different contents of the α-Al$_2$O$_3$ powder, as listed in Table 7. For example, an amount of the α-Al$_2$O$_3$ powder in the second mixture of Example 49 is determined such that when all of Al included in the ceramic material is converted to Al$_2$O$_3$, an Al$_2$O$_3$ content in the ceramic material is 30 vol %. The second mixture was molded into a disk having a diameter of 60 mm and a thickness of 5 mm by means of a uni-axis press molding and cold isostatic pressing (CIP) treatment. The disk was sintered at 1500° C. in the air for 2 hours under an atmospheric pressure. In Comparative Example 5, the calcined powder of the first constituent was molded and sintered without the α-Al$_2$O$_3$ powder being used.

Each of the ceramic materials of Examples 47 to 51 was sufficiently densified by the sintering. By the use of a scanning electron microscope (SEM) and a transmission electron microscope (TEM), it is observed that each of the ceramic materials is composed of a ZrO$_2$ grain phase, α-Al$_2$O$_3$ grain phase, and an elongated crystal phase of a complex oxide of Ce, Al, and Mg or Ca. An area ratio of the elongated crystal phase in the ceramic material was measured according to the same manner as Example 1. In Examples 47 to 51, the area ratio is within a range of 1.6 to 1.8 area %, an average length of the elongated crystals is within a range of 14.0 to 14.7 μm, and an average aspect ratio of the elongated crystals is within a range of 12.5 to 14.3. Minimum and maximum lengths of the elongated crystals are 4.6 μm and 28.7 μm, respectively. These results are listed in Tables 8.

As listed in Table 7, the average grain sizes of the $ZrO_2$ grain phase and the $\alpha$-$Al_2O_3$ grain phase in Examples 47 to 51 are within a range of 1.1 to 2.7 μm, and less than 1 μm, respectively. There is a tendency that as the $Al_2O_3$ content in the second mixture increases, a grain growth of $ZrO_2$ is prevented. A dispersion ratio (W %) of fine $\alpha$-$Al_2O_3$ grains dispersed within the $ZrO_2$ grains was measured according to the same manner as Example 1. In Examples 47 to 51, the dispersion ratio is within a range of 2.0 to 3.4.

Mechanical strength and fracture toughness of the ceramic materials were measured according to the same methods as Example 1. Results are listed in Table 8. Furthermore, quantification of tetragonal $ZrO_2$ in the $ZrO_2$ grain phase was carried out by X-ray diffraction analysis. As listed in Table 7, a content of tetragonal $ZrO_2$ in the $ZrO_2$ grain phase in Examples 47 to 51 and Comparative Examples 5 and 6 is within a range of 95 vol % or more, and the balance is monoclinic $ZrO_2$.

As to Comparative Example 5, the mechanical strength of the ceramic material decreases because of a lack of the $Al_2O_3$ grain phase. On the other hand, the ceramic material of Comparative Example 6 shows poor mechanical strength and fracture toughness because of an excess amount of $Al_2O_3$ grain phase in the ceramic material.

Comparative Example 7

A $ZrO_2$ based ceramic material of Comparative Example 7 was produced in accordance with a substantially same method as Example 27 except for using an $\alpha$-$Al_2O_3$ powder having an average grain size of 53 μm in place of the $\alpha$-$Al_2O_3$ powder used in Example 27.

The ceramic material of Comparative Examples 7 was sufficiently densified by the sintering. By the use of a scanning electron microscope and a transmission electron microscope, it is observed that an average grain size of an $\alpha$-$Al_2O_3$ grain phase is 5.9 μm, as listed in Table 9, and most of the $\alpha$-$Al_2O_3$ grains are dispersed in grain boundaries of a $ZrO_2$ grain phase. A result of X-ray diffraction analysis shows that the $ZrO_2$ grain phase of this ceramic material is formed with 95 vol % or more of tetragonal $ZrO_2$ and the balance of monoclinic $ZrO_2$. A dispersion ratio (W %) of fine $\alpha$-$Al_2O_3$ grains dispersed within the $ZrO_2$ grains, mechanical strength and fracture toughness of the ceramic material, were measured according to the same methods as Example 1. Results are listed in Tables 10.

Due to the large average grain size of the $Al_2O_3$ grain phase and a decrease of the dispersion ratio, the mechanical strength and fracture toughness of the ceramic material of Comparative Example 7 is much lower than those of Examples 27.

TABLE 7

| | Starting material | | | | | $ZrO_2$ Based Ceramic Material | | |
| | 1st constituent (mol %) | | | | 2nd constituent (vol %) | Average Grain Size (μm) | | $ZrO_2$ Crystal |
| | $CeO_2$ | MgO | CaO | $TiO_2$ | $Al_2O_3$ | $ZrO_2$ | $Al_2O_3$ | Phase |
|---|---|---|---|---|---|---|---|---|
| Comparative Example 5 | 10 | 0.05 | 0 | 1 | 0 | 4.1 | — | T |
| Example 47 | 10 | 0.05 | 0 | 1 | 10 | 2.7 | 0.5 | T |
| Example 48 | 10 | 0.05 | 0 | 1 | 20 | 1.7 | 0.6 | T |
| Example 49 | 10 | 0.05 | 0 | 1 | 30 | 1.4 | 0.6 | T |
| Example 50 | 10 | 0.05 | 0 | 1 | 40 | 1.2 | 0.7 | T |
| Example 51 | 10 | 0.05 | 0 | 1 | 50 | 1.1 | 0.8 | T |
| Comparative Example 6 | 10 | 0.05 | 0 | 1 | 60 | 0.9 | 1.0 | T |

TABLE 8

| | Bending Strength (MPa) | Fracture Toughness (MPa·m^{1/2}) | Dispersion Ratio of $Al_2O_3$ (%) | Area Ratio of Complex Oxide (area %) | Average Length of Complex oxide [Min.–Max.] (μm) | Average Aspect Ratio of Complex Oxide [Min.–Max.] |
|---|---|---|---|---|---|---|
| Comparative Example 5 | 500 | 21.6 | — | — | — | — |
| Example 47 | 840 | 19.8 | 2.2 | 1.6 | 14.0 [4.9–25.6] | 12.5 [4.4–18.6] |
| Example 48 | 1000 | 18.4 | 2.8 | 1.7 | 14.1 [5.5–26.3] | 13.5 [4.8–19.2] |
| Example 49 | 1020 | 17.7 | 3.4 | 1.7 | 14.3 [5.0–28.7] | 13.9 [4.1–18.8] |
| Example 50 | 980 | 17.2 | 2.6 | 1.8 | 14.7 [5.2–24.6] | 13.7 [4.5–17.7] |
| Example 51 | 920 | 15.4 | 2.0 | 1.8 | 14.5 [4.6–27.9] | 14.3 [4.3–18.3] |
| Comparative Example 6 | 560 | 11.1 | 0.9 | 1.8 | 14.9 [5.5–25.1] | 14.1 [4.4–17.8] |

TABLE 9

| | Starting material | | | | ZrO$_2$ Based Ceramic Material | | |
|---|---|---|---|---|---|---|---|
| | 1st constituent (mol %) | | | | 2nd constituent (vol %) | Average Grain Size ($\mu$m) | | ZrO$_2$ Crystal |
| | CeO$_2$ | MgO | CaO | TiO$_2$ | Al$_2$O$_3$ | ZrO$_2$ | Al$_2$O$_3$ | Phase |
| Example 27 | 10 | 0.01 | 0 | 0.05 | 30 | 0.9 | 0.4 | T |
| Comparative Example 7 | 10 | 0.01 | 0 | 0.05 | 30 | 1.1 | 5.9 | T |

TABLE 10

| | Bending Strength (MPa) | Fracture Toughness (MPa · m$^{1/2}$) | Dispersion Ratio of Al$_2$O$_3$ (%) | Area Ratio of Complex Oxide (area %) | Average Length of Complex oxide [Min.–Max.] ($\mu$m) | Average Aspect Ratio of Complex Oxide [Min.–Max.] |
|---|---|---|---|---|---|---|
| Example 27 | 920 | 19.6 | 2.5 | 0.7 | 4.8 [2.0–10.8] | 5.5 [2.2–9.6] |
| Comparative Example 7 | 370 | 10.6 | 0.3 | 0.2 | 6.5 [3.6–8.4] | 1.6 [1–3.5] |

EXAMPLES 52

A ZrO$_2$ based ceramic material of Example 52 was produced in accordance with a substantially same method as Example 27 except that the sintering temperature is 1450° C., and a HIP (Hot Isostatic Pressing) treatment was performed after the sintering step at a temperature of 1350° C. for an 1 hour under a pressure of 150 MPa of a mixture gas of argon and oxygen (argon/oxygen =90/10).

The ceramic material of Example 52 was sufficiently densified by the HIP treatment. By the use of a scanning electron microscope and transmission electron microscope, it is observed that an average grain size of a ZrO$_2$ grain phase is slightly small than that of Example 27, as listed in Table 11, and some of fine Al$_2$O$_3$ grains are dispersed within the ZrO$_2$ grains. In addition, it is observed that fine ZrO$_2$ grains are dispersed within relatively long crystals of a complex oxide of Al, Ce and Mg, and relatively large $\alpha$-Al$_2$O$_3$ grains. A result of X-ray diffraction analysis shows that the ZrO$_2$ grain phase of this ceramic material is formed with 95 vol % or more of tetragonal ZrO$_2$ and the balance of monoclinic ZrO$_2$. A dispersion ratio (W %) of fine $\alpha$Al$_2$O$_3$ grains dispersed within the ZrO$_2$ grains, mechanical strength and fracture toughness of the ceramic material, were measured in accordance with the same methods as Example 1. Results are listed in Table 12. The results show that the HIP treatment is useful to improve the mechanical strength.

TABLE 11

| | Starting material | | | | Composite Ceramic Material | | |
|---|---|---|---|---|---|---|---|
| | 1st constituent (mol %) | | | | 2nd constituent (vol %) | Average Grain Size ($\mu$m) | | ZrO$_2$ Crystal |
| | CeO$_2$ | MgO | CaO | TiO$_2$ | Al$_2$O$_3$ | ZrO$_2$ | Al$_2$O$_3$ | Phase |
| Example 27 | 10 | 0.01 | 0 | 0.05 | 30 | 0.9 | 0.4 | T |
| Example 52 | 10 | 0.01 | 0 | 0.05 | 30 | 0.8 | 0.4 | T |

TABLE 12

| | Bending Strength (MPa) | Fracture Toughness (MPa · m$^{1/2}$) | Dispersion Ratio of Al$_2$O$_3$ (%) | Area Ratio of Complex Oxide (area %) | Average Length of Complex oxide [Min.–Max.] ($\mu$m) | Average Aspect Ratio of Complex Oxide [Min.–Max.] |
|---|---|---|---|---|---|---|
| Example 27 | 920 | 19.6 | 2.5 | 0.7 | 4.8 [2.0–10.8] | 5.5 [2.2–9.6] |
| Example 52 | 1150 | 19.1 | 2.4 | 0.8 | 4.2 [2.1–7.6] | 5.1 [2.2–7.7] |

EXAMPLES 53 TO 60

ZrO$_2$ based ceramic materials of Examples 53 and 54 were produced in accordance with a substantially same method as Example 1 except that a MgCO$_3$ powder having an average grain size of 0.3 $\mu$m was used in place of the MgO powder. As listed in Table 13, an amount of the MgCO$_3$ powder used in Example 53 is determined such that when MgCO$_3$ in a first mixture is converted to MgO, a MgO content in the first mixture is 0.01 mol % relative to ZrO$_2$. Similarly, an amount of the MgCO$_3$ powder used in Example 54 is determined such that the MgO content is 0.1 mol % relative to ZrO$_2$.

$ZrO_2$ based ceramic materials of Examples 55 and 56 were produced in accordance with a substantially same method as Example 1 except that a $CaCO_3$ powder having an average grain size of 0.3 μm was used in place of the MgO powder. As listed in Table 13, an amount of the $CaCO_3$ powder used in Example 55 is determined such that when $CaCO_3$ in a first mixture is converted to CaO, a CaO content in the first mixture is 0.01 mol % relative to $ZrO_2$. Similarly, an amount of the $CaCO_3$ powder used in Example 56 is determined such that the CaO content is 0.1 mol % relative to $ZrO_2$.

$ZrO_2$ based ceramic materials of Examples 57 and 58 were produced in accordance with a substantially same method as Example 1 except that a $Mg(OH)_2$ powder having an average grain size of 0.3 μm was used in place of the MgO powder. As listed in Table 13, an amount of the $Mg(OH)_2$ powder used in Example 57 is determined such that when $Mg(OH)_2$ in a first mixture is converted to MgO, a MgO content in the first mixture is 0.01 mol % relative to $ZrO_2$. Similarly, the amount of the $Mg(OH)_2$ powder used in Example 58 is determined such that the MgO content is 0.1 mol % relative to $ZrO_2$.

$ZrO_2$ based ceramic materials of Examples 59 and 60 were produced in accordance with a substantially same method as Example 1 except that a $Ca(OH)_2$ powder having an average grain size of 0.3 μm was used in place of the MgO powder. As listed in Table 13, an amount of the $Ca(OH)_2$ powder used in Example 59 is determined such that when $Ca(OH)_2$ in a first mixture is converted to CaO, a CaO content in the first mixture is 0.01 mol % relative to $ZrO_2$. Similarly, an amount of the $Ca(OH)_2$ powder used in Example 60 is determined such that the CaO content is 0.1 mol % relative to $ZrO_2$.

Each of the ceramic materials of Examples 53 to 60 was sufficiently densified by the sintering. By the use of a scanning electron microscope and a transmission electron microscope, it is observed that these ceramic materials has a common micro-structure composed of a $ZrO_2$ grain phase, α-$Al_2O_3$ grain phase, and an elongated crystal phase of a complex oxide of Ce, Al, and Mg or Ca. An area ratio of the elongated crystal phase in the ceramic material was measured according to the same manner as Example 1. In Examples 53 to 60, the area ratio of the elongated crystal phase is within a range of 0.6 to 3.2 area %, an average length of the elongated crystals is within a range of 4.9 to 24.7 μm, and an average aspect ratio of the elongated crystals is within a range of 4.8 to 17.8. Minimum and maximum lengths of the elongated crystals are 2.0 μm and 41.3 μm, respectively. These results are listed in Tables 14.

In addition, it is observed that fine $Al_2O_3$ grains are dispersed within the $ZrO_2$ grains, and fine $ZrO_2$ grains are dispersed within relatively long crystals of the complex oxide and relatively large α-$Al_2O_3$ grains. Results of X-ray diffraction analysis show that a content of tetragonal $ZrO_2$ in the $ZrO_2$ grain phase in Examples 53 to 60 is within a range of 95 vol % or more, and the balance is monoclinic $ZrO_2$. A dispersion ratio (W %) of fine α-$Al_2O_3$ grains dispersed within the $ZrO_2$ grains, mechanical strength and fracture toughness of the ceramic material, were measured according to the same methods as Example 1. Results are listed on Table 14.

TABLE 13

| | Starting material | | | | | $ZrO_2$ Based Ceramic Material | | |
|---|---|---|---|---|---|---|---|---|
| | 1st constituent | | | | 2nd constituent | Average Grain Size | | |
| | (mol %) | | | | (vol %) | (μm) | | $ZrO_2$ Crystal |
| | MgO) | CaO | MgO | CaO | | | | |
| | ($MgCO_3$) | ($CaCO_3$) | ($Mg(OH)_2$) | ($Ca(OH)_2$) | $Al_2O_3$ | $ZrO_2$ | $Al_2O_3$ | Phase |
| Example 53 | 0.01 | 0 | 0 | 0 | 30 | 1.4 | 0.6 | T |
| Example 54 | 0.1 | 0 | 0 | 0 | 30 | 1.4 | 0.6 | T |
| Example 55 | 0 | 0.01 | 0 | 0 | 30 | 1.4 | 0.6 | T |
| Example 56 | 0 | 0.1 | 0 | 0 | 30 | 1.4 | 0.6 | T |
| Example 57 | 0 | 0 | 0.01 | 0 | 30 | 1.6 | 0.7 | T |
| Example 58 | 0 | 0 | 0.1 | 0 | 30 | 1.6 | 0.7 | T |
| Example 59 | 0 | 0 | 0 | 0.01 | 30 | 1.6 | 0.7 | T |
| Example 60 | 0 | 0 | 0 | 0.1 | 30 | 1.6 | 0.7 | T |

TABLE 14

| | Bending Strength (MPa) | Fracture Toughness (MPa·$m^{1/2}$) | Dispersion Ratio of $Al_2O_3$ (%) | Area Ratio of Complex Oxide (area %) | Average Length of Complex oxide [Min.–Max.] (μm) | Average Aspect Ratio of Complex Oxide [Min.–Max.] |
|---|---|---|---|---|---|---|
| Example 53 | 900 | 18.1 | 3.4 | 0.6 | 5.1 [2.0–10.6] | 5.3 [2.2–8.6] |
| Example 54 | 1130 | 17.0 | 3.4 | 2.9 | 24.2 [8.0–37.6] | 17.4 [7.4–21.1] |
| Example 55 | 880 | 17.8 | 3.4 | 0.7 | 5.3 [2.1–11.8] | 5.2 [2.3–9.5] |
| Example 56 | 1100 | 16.8 | 3.4 | 3.1 | 23.6 [7.5–38.6] | 17.0 [7.3–22.3] |
| Example 57 | 920 | 17.3 | 3.5 | 0.7 | 4.9 [2.2–11.3] | 4.8 [2.4–8.1] |
| Example 58 | 1140 | 16.2 | 3.5 | 3.0 | 24.7 [8.2–40.6] | 17.6 [6.9–23.4] |

TABLE 14-continued

| | Bending Strength (MPa) | Fracture Toughness (MPa·m$^{1/2}$) | Dispersion Ratio of Al$_2$O$_3$ (%) | Area Ratio of Complex Oxide (area %) | Average Length of Complex oxide [Min.–Max.] ($\mu$m) | Average Aspect Ratio of Complex Oxide [Min.–Max.] |
|---|---|---|---|---|---|---|
| Example 59 | 900 | 17.0 | 3.5 | 0.7 | 5.5 [2.3–12.1] | 5.5 [2.1–9.2] |
| Example 60 | 1120 | 15.9 | 3.5 | 3.2 | 25.1 [7.6–41.3] | 17.8 [7.8–23.1] |

EXAMPLES 61 TO 63

In Example 61, a first aqueous solution of zirconium oxychloride (ZrOCl$_2$.8H$_2$O) was hydrolyzed by adding aqueous ammonia thereto to obtain a sol solution of ZrO$_2$. The sol solution was mixed with a second aqueous solution of cerium chloride (CeCl$_3$.7H$_2$O), a third aqueous solution of titanium chloride (TiCl$_4$), and a fourth aqueous solution of magnesium chloride (MgCl$_2$), while agitating a resultant mixture. The mixture was dropped into aqueous ammonia, while agitating the aqueous ammonia, to thereby obtain a precipitate. After the precipitate was washed with water and dried, it was heated at 950° C. in the air for 3 hours to obtain a calcined powder as a first constituent. Amounts and concentrations of the second to fourth aqueous solutions in the mixture are determined such that the calcined powder contains 10 mol % of CeO$_2$, 1 mol % of TiO$_2$, and 0.1 mol % of MgO relative to ZrO$_2$, as listed in Table 15. The calcined powder was ball-milled with a γ-Al$_2$O$_3$ powder having a specific surface area of 300 m$^2$/g as a second constituent in the presence of ethanol for 24 hours by the use of balls made of tetragonal ZrO$_2$ and a polyethylene vessel. The resultant is then dried to obtain a mixed powder of Example 61. An amount of the γ-Al$_2$O$_3$ powder in the mixed powder is determined such that when all of Al included in a ZrO$_2$ based ceramic material of Example 61 is converted to Al$_2$O$_3$, an Al$_2$O$_3$ content in the ceramic material is 30 vol %.

In Example 62, the calcined powder prepared in Example 61 is mixed with a hydrochloride solution of aluminum chloride (AlCl$_3$), while agitating a resultant, to thereby obtain a first mixture. The first mixture was hydrolyzed by an aqueous solution of sodium hydroxide (NaOH) to obtain a second mixture of the calcined power and a precipitate of aluminum hydroxide. After the second mixture was washed with water and dried, it was heated at 1000° C. in the air for 3 hours to change aluminum hydroxide to Al$_2$O$_3$ and obtain a mixed powder of Example 62. An amount and a concentration of the hydrochloride solution of AlCl$_3$ in the first mixture are determined such that when all of Al included in a ZrO$_2$ based ceramic material of Example 62 is converted to Al$_2$O$_3$, an Al$_2$O$_3$ content in the ceramic material is 30 vol %.

In Example 63, a first aqueous solution of zirconium oxychloride (ZrOCl$_2$.8H$_2$O) was hydrolyzed by adding aqueous ammonia thereto to obtain a sol solution of ZrO$_2$. The sol solution was mixed with a second aqueous solution of cerium chloride (CeCl$_3$.7H$_2$O), a third aqueous solution of magnesium chloride (MgCl$_2$), and a first isopropanol solution of titanium isopropoxide [Ti(iOC$_3$H$_7$)$_4$], while agitating a resultant, to thereby obtain a first mixture. The first mixture was dropped into aqueous ammonia, while agitating the aqueous ammonia, to thereby obtain a first precipitate. After the first precipitate was washed with water and dried, it was heated at 850° C. in the air for 3 hours to obtain a calcined powder as a first constituent. Amounts and concentrations of the second and third aqueous solutions and the first isopropanol solution in the first mixture are determined such that the calcined powder contains 10 mol % of CeO$_2$, 1 mol % of TiO$_2$, and 0.1 mol % of MgO relative to ZrO$_2$, as listed in Table 15. The calcined powder was mixed with a second isopropanol solution of aluminum isopropoxide [Al(iOC$_3$H$_7$)$_3$] to obtain a mixed solution. The mixed solution was hydrolyzed to obtain a second mixture of the calcined power and a precipitate. After the second mixture was washed with water and dried, it was heated at 1000° C. in the air for 3 hours to obtain a mixed powder of Example 63. An amount and a concentration of the second isopropanol solution in the mixed solution are determined such that when all of Al included in a ZrO$_2$ based ceramic material of Example 63 is converted to Al$_2$O$_3$, an Al$_2$O$_3$ content in the ceramic material is 30 vol %.

The mixed powder formed in each of Examples 61 to 63 was molded into a disk having a diameter of 60 mm and a thickness of 5 mm by means of a uni-axis press molding and a cold isostatic pressing (CIP) treatment. The disk was sintered at 1500° C. in the air under an atmospheric pressure for 2 hours to obtain the ZrO$_2$ based ceramic material.

Each of the ceramic materials of Examples 61 to 63 was sufficiently densified by the sintering. By the use of a scanning electron microscope and a transmission electron microscope, it is observed that these ceramic materials has a common micro-structure composed of a ZrO$_2$ grain phase, α-Al$_2$O$_3$ grain phase, and an elongated crystal phase of a complex oxide of Ce, Al, and Mg. An area ratio of the elongated crystal phase in the ceramic material was measured according to the same manner as Example 1. In Examples 61 to 63, the area ratio is within a range of 03.1 to 3.3 area %, an average length of the elongated crystals is within a range of 23.8 to 24.5 $\mu$m, and an average aspect ratio of the elongated crystals is within a range of 17.1 to 17.4. Minimum and maximum lengths of the elongated crystals are 8.0 $\mu$m and 41.5 $\mu$m, respectively. These results are listed in Tables 16.

In addition, it is observed that a relatively large amount of fine Al$_2$O$_3$ grains are dispersed within the ZrO$_2$ grains. From X-ray diffraction analysis, it is confirmed that a content of tetragonal ZrO$_2$ in the ZrO$_2$ grain phase in Examples 61 to 63 is within a range of 95 vol % or more, and the balance is monoclinic ZrO$_2$. In Example 61, it is also confirmed that the γ-Al$_2$O$_3$ powder is completely converted to α-Al$_2$O$_3$. A dispersion ratio (W %) of fine oc-Al$_2$O$_3$ grains dispersed within the ZrO$_2$ grains, mechanical strength and fracture toughness of the ceramic materials, were measured in accordance with the same methods as Example 1. Results are listed on Table 16.

TABLE 15

| | Starting material | | | | | ZrO₂ Based Ceramic Material | | |
|---|---|---|---|---|---|---|---|---|
| | 1st constituent (mol %) | | | | 2nd constituent (vol %) | Average Grain Size (μm) | | ZrO₂ Crystal |
| | CeO₂ | MgO | CaO | TiO₂ | Al₂O₃ | ZrO₂ | Al₂O₃ | Phase |
| Example 61 | 10 | 0.1 | 0 | 1 | 30 | 1.4 | 0.6 | T |
| Example 62 | 10 | 0.1 | 0 | 1 | 30 | 1.4 | 0.6 | T |
| Example 63 | 10 | 0.1 | 0 | 1 | 30 | 1.4 | 0.6 | T |

TABLE 16

| | Bending Strength (MPa) | Fracture Toughness (MPa · m^{1/2}) | Dispersion Ratio of Al₂O₃ (%) | Area Ratio of Complex Oxide (area %) | Average Length of Complex oxide [Min.–Max.] (μm) | Average Aspect Ratio of Complex Oxide [Min.–Max.] |
|---|---|---|---|---|---|---|
| Example 61 | 1160 | 17.5 | 3.6 | 3.1 | 23.8 [8.3–40.6] | 17.3 [7.0–22.8] |
| Example 62 | 1170 | 17.6 | 3.7 | 3.3 | 24.5 [9.7–39.9] | 17.1 [7.3–23.1] |
| Example 63 | 1150 | 17.7 | 3.6 | 3.2 | 24.4 [8.0–41.5] | 17.4 [7.2–23.5] |

Examples 64–65 and Comparative Examples 8–9

$ZrO_2$ based ceramic materials of these Examples and Comparative Examples are produced in accordance with a substantially same method as Example 28 except for adopting different sintering temperatures, as listed in Table 17.

In Examples 64 and 65, each of the ceramic materials was sufficiently densified by the sintering. By the use of a scanning electron microscope and a transmission electron microscope, it is observed that these ceramic materials has a common micro-structure composed of a $ZrO_2$ grain phase, $\alpha$-$Al_2O_3$ grain phase, and an elongated crystal phase of a complex oxide of Ce, Al, and Mg. As listed in Table 17, as the sintering temperature is higher from 1400° C. toward 1600° C., there is a tendency of increasing average grain sizes of the $ZrO_2$ grain phase and $\alpha$-$Al_2O_3$ grain phase, an area ratio of the elongated crystal phase in the ceramic material, and a dispersion ratio (W %) of fine $\alpha$-$Al_2O_3$ grains dispersed within the $ZrO_2$ grains. In Examples 28, 64 and 65, the ceramic material of Example 28 sintered at 1500° C. shows the maximum mechanical strength and fracture toughness, i.e., 1160 MPa and 18.8 MPa.m$_{1/2}$. From X-ray diffraction analysis, it is confirmed that a content of tetragonal $ZrO_2$ in the $ZrO_2$ grain phase in Examples 64 and 65 is within a range of 95 vol % or more, and the balance is monoclinic $ZrO_2$.

In Comparative Example 8, the ceramic material was not densely sintered at the low sintering temperature of 1300° C., so that both of the mechanical strength and fracture toughness remarkably decrease, as listed in Table 18. In addition, the elongated crystal phase was not formed in the ceramic material. On man the other hand, the ceramic material of Comparative Example 9 was densely sintered at the high sintering temperature of 1700° C. However, since a crystal growth of the elongated crystal phase and grain growths of the $ZrO_2$ grain phase and $\alpha$-$Al_2O_3$ grain phase excessively proceed at the high sintering temperature, the ceramic material shows a poor bending strength, as listed in Table 18.

From these results of Examples 1 to 65, it would be understood that the $ZrO_2$ based ceramic materials included in the present invention could provide excellent mechanical properties, and particularly great fracture toughness.

TABLE 17

| | Starting material | | | | | Sintering Temp. (°C.) | ZrO₂ Based Ceramic Material | | |
|---|---|---|---|---|---|---|---|---|---|
| | 1st constituent (mol %) | | | | 2nd constituent (vol %) | | Average Grain Size (μm) | | ZrO₂ Crystal |
| | CeO₂ | MgO | CaO | TiO₂ | Al₂O₃ | | ZrO₂ | Al₂O₃ | Phase |
| Comparative Example 8 | 10 | 0.1 | 0 | 0.05 | 30 | 1300 | 0.3 | 0.2 | T |
| Example 64 | 10 | 0.1 | 0 | 0.05 | 30 | 1400 | 0.6 | 0.3 | T |
| Example 28 | 10 | 0.1 | 0 | 0.05 | 30 | 1500 | 0.9 | 0.4 | T |
| Example 65 | 10 | 0.1 | 0 | 0.05 | 30 | 1600 | 1.5 | 0.8 | T |
| Comparative Example 9 | 10 | 0.1 | 0 | 0.05 | 30 | 1700 | 3.5 | 3.1 | T |

TABLE 18

|  | Bending Strength (MPa) | Fracture Toughness (MPa · m$^{1/2}$) | Dispersion Ratio of Al$_2$O$_3$ (%) | Area Ratio of Complex Oxide (area %) | Average Length of Complex oxide [Min.–Max.] ($\mu$m) | Average Aspect Ratio of Complex Oxide [Min.–Max.] |
|---|---|---|---|---|---|---|
| Comparative Example 8 | 320 | 9.5 | 0.5 | — | — | — |
| Example 64 | 670 | 13.3 | 2.1 | 0.9 | 17.2 [6.9–27.3] | 15.1 [5.9–18.1] |
| Example 28 | 1160 | 18.8 | 2.5 | 3.2 | 25.3 [8.2–40.6] | 16.8 [6.0–21.1] |
| Example 65 | 700 | 18.6 | 2.8 | 5.0 | 34.6 [9.5–50.0] | 19.5 [7.9–25.0] |
| Comparative Example 9 | 440 | 16.7 | 0.2 | 6.3 | 51.2 [16.3–82.3] | 23.6 [8.6–28.3] |

What is claimed is:

1. A ZrO$_2$ based ceramic material comprising:

a first phase of ZrO$_2$ grains containing CeO$_2$ as a stabilizer and having an average grain size of 5 $\mu$m or less, at least 90 vol % of said first phase composed of tetragonal ZrO$_2$;

a second phase of Al$_2$O$_3$ grains having an average grain size of 2 $\mu$m or less;

a third phase of elongated crystals of a complex oxide of Al, Ce, and one of Mg and Ca;

an aluminum content in said ceramic material being determined such that when aluminum of said complex oxide is converted to Al$_2$O$_3$, a total amount of Al$_2$O$_3$ in said ceramic material is within a range of 0.5 to 50 vol %;

a content of said third phase in said ceramic material being determined within a range of 0.5 to 5 by area %.

2. The ZrO$_2$ based ceramic material as set forth in claim 1, wherein Al$_2$O$_3$ grains having an average grain size of 1 $\mu$m or less of said second phase are dispersed within said ZrO$_2$ grains at a dispersion ratio of at least 2%, said dispersion ratio being defined as a ratio of the number of said Al$_2$O$_3$ grains dispersed within said ZrO$_2$ grains relative to the entire Al$_2$O$_3$ grains dispersed in said ceramic material.

3. The ZrO$_2$ based ceramic material as set forth in claim 2, wherein said first phase contains 0.05 to 4 mol % of TiO$_2$.

4. The ZrO$_2$ based ceramic material as set forth in claim 1, wherein said elongated crystals have an average length of 2 to 50 $\mu$m with a maximum length up to 70 $\mu$m.

5. The ZrO$_2$ based ceramic material as set forth in claim 4, wherein an average aspect ratio of said elongated crystals is within a range of 2 to 25, said aspect ratio being defined as a ratio of length to width of said elongated crystals.

6. The ZrO$_2$ based ceramic material as set forth in claim 1, wherein ZrO2 grains having an average grain size of 1 $\mu$m or less of said first phase are dispersed within said Al$_2$O$_3$ grains.

7. The ZrO$_2$ based ceramic material as set forth in claim 1, wherein ZrO$_2$ grains having an average grain size of 1 $\mu$m or less of said first phase are dispersed within said elongated crystals of said third phase.

8. A method of producing said ZrO$_2$ based ceramic material of claim 1 comprising the steps of:

mixing a first constituent corresponding to a composition of 8 to 12 mol % of CeO$_2$, 0.01 to 0.1 mol % of one of MgO and CaO, and the balance of ZrO$_2$ with a second constituent for forming Al$_2$O$_3$, to obtain a mixed powder;

molding said mixed power to a green compact having a desired shape; and sintering said green compact in an oxidative atmosphere at a temperature between 1400° C. and 1600° C. under an atmospheric pressure, said third phase of said ceramic material being formed by a reaction of Ce and one of Mg and Ca supplied from said first constituent with Al supplied from said second constituent in said oxidative atmosphere during the sintering.

9. The method as set forth in claim 8, wherein said composition of said first constituent contains 0.05 to 4 mol % of TiO$_2$.

10. The method as set forth in claim 9, wherein said first constituent is prepared by the steps of:

mixing a ZrO$_2$ powder containing CeO$_2$ and TiO$_2$ with a powder selected from a group of MgCO$_3$, CaCO$_3$, MgO, CaO, Mg(OH)$_2$, and Ca(OH)$_2$, to obtain a first mixed powder;

heating said first mixed powder to obtain a calcined powder; and milling said calcined powder.

11. The method as set forth in claim 9, wherein said first constituent is prepared by the steps of:

forming a mixture solution containing salts of Zr, Ce, Ti, and one of Ca and Mg;

adding an alkali solution to said mixture solution to generate a precipitate;

drying and heating said precipitate to obtain a calcined powder; and milling said calcined powder.

12. The method as set forth in claim 9, wherein said first constituent is prepared by the steps of:

forming a mixture solution containing salts of Zr, Ce, one of Ca and Mg, and an alkoxide of Ti;

adding an alkali solution to said mixture solution to generate a precipitate;

drying and heating said precipitate to obtain a calcined powder; and milling said calcined powder.

13. The method as set forth in claim 8, wherein said first constituent is prepared by the steps of:

mixing a ZrO$_2$ powder containing CeO$_2$ with a powder selected from a group of MgCO$_3$, CaCO$_3$, MgO, CaO, Mg(OH)$_2$, and Ca(OH)$_2$, to obtain a first mixed powder;

heating said first mixed powder to obtain a calcined powder; and milling said calcined powder.

14. The method as set forth in claim 8, wherein said first constituent is prepared by the steps of:

forming a mixture solution containing salts of Zr, Ce, and one of Ca and Mg;

adding an alkali solution to said mixture solution to generate a precipitate;

drying and heating said precipitate to obtain a calcined powder; and milling said calcined powder.

15. The method as set forth in claim 8, wherein said mixed powder is prepared by the steps of:

mixing said first constituent with an aqueous solution of an aluminum salt to obtain a mixture solution;

adding an alkali solution to said mixture solution to obtain a mixture of said first constituent and a precipitation of aluminum hydroxide;

drying and heating said mixture to obtain a calcined powder; and milling said calcined powder.

16. The method as set forth in claim 8, wherein said mixed powder is prepared by the steps of:

mixing said first constituent with an organic solution of an aluminum alkoxide to obtain a mixture solution;

hydrolyzing said aluminum alkoxide in said mixture solution to obtain a mixture of said first constituent and a precipitation;

drying and heating said mixture to obtain a calcined powder; and milling said calcined powder.

17. The method as set forth in claim 8, wherein said second constituent is a powder of $\alpha\text{-Al}_2\text{O}_3$ having an average grain size of 0.5 μm or less.

18. The method as set forth in claim 8, wherein said second constituent is a powder of $\gamma\text{-Al}_2\text{O}_3$ having a specific surface area of 100 m$^2$/g or more.

19. The method as set forth in claim 18, wherein said mixed powder is prepared by the steps of:

mixing said first constituent with said $\gamma\text{-Al}_2\text{O}_3$ powder to obtain a first mixed powder;

heating said first mixed powder at a temperature of 1000° C. or more and less than said sintering temperature to obtain a calcined powder; and milling said calcined powder.

20. The method as set forth in claim 8, further comprising the step of performing a hot isostatic pressing (HIP) treatment to said ceramic material in an oxidative atmosphere after said sintering step.

21. The method as set forth in claim 8, wherein said first constituent is provided with a powder having a specific surface of 10 to 30 m$^2$/g.

* * * * *

UNITED STATES PATENT AND TRADEMARK OFFICE
CERTIFICATE OF CORRECTION

PATENT NO. : 5,854,158
DATED : December 29, 1998
INVENTOR(S) : Masahiro Nawa, et al.

It is certified that error appears in the above-indentified patent and that said Letters Patent is hereby corrected as shown below:

On the title page:
Item [73] after "Matsushita Electric Works, Ltd., Osaka, Japan", please insert -- and Koichi NIIHARA, Osaka, Japan--.

Signed and Sealed this

Twenty-sixth Day of October, 1999

*Attest:*

Q. TODD DICKINSON

*Attesting Officer*    *Acting Commissioner of Patents and Trademarks*